United States Patent
Kuwata et al.

(10) Patent No.: US 6,766,112 B2
(45) Date of Patent: Jul. 20, 2004

(54) FOCAL POINT DETECTION APPARATUS AND FOCAL POINT DETECTION MODULE

(75) Inventors: Chiyuki Kuwata, Zushi (JP); Hideki Kanbayashi, Yokohama (JP); Masamitsu Ozawa, Kawasaki (JP); Shigeyuki Uchiyama, Komae (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/968,756

(22) Filed: Oct. 3, 2001

(65) Prior Publication Data

US 2002/0136550 A1 Sep. 26, 2002

Related U.S. Application Data

(63) Continuation-in-part of application No. 09/824,055, filed on Apr. 3, 2001, now abandoned.

(30) Foreign Application Priority Data

| Apr. 3, 2000 | (JP) | 2000-100947 |
| May 2, 2000 | (JP) | 2000-133733 |
| Jul. 7, 2000 | (JP) | 2000-206690 |
| Jul. 6, 2001 | (JP) | 2001-206599 |

(51) Int. Cl.$^7$ .............................................. G03B 13/36
(52) U.S. Cl. ..................................................... 396/114
(58) Field of Search ................................ 396/114, 111, 396/121; 250/201.8, 201.7, 201.2

(56) References Cited

U.S. PATENT DOCUMENTS

| 5,017,005 A | * | 5/1991 | Shindo .................... 396/114 X |
| 5,229,807 A | * | 7/1993 | Karasaki et al. ............ 396/114 |
| 5,258,804 A | | 11/1993 | Suda ........................... 396/121 |
| 5,822,627 A | * | 10/1998 | Moriyama .................. 396/121 |

FOREIGN PATENT DOCUMENTS

| JP | A 3-235906 | 10/1991 | ............ G02B/7/34 |
| JP | A 9-243905 | 9/1997 | ............ G02B/7/28 |
| JP | A 9-304691 | 11/1997 | ............ G02B/7/34 |

OTHER PUBLICATIONS

"Autofocusing Technology Adopted In Single Lens Reflex Cameras" Optics, vol. 18, Nov. 1989, pp. 604–610.

* cited by examiner

Primary Examiner—W. B. Perkey
(74) Attorney, Agent, or Firm—Oliff & Berridge PLC

(57) ABSTRACT

A sub-mirror which deflects a focal point detection light flux passing through an area off the optical axis of a photographing optical system toward the optical axis and a second deflection member that deflects the focal point detection light flux deflected by the sub-mirror to allow it to advance roughly parallel to the photographic optical axis are provided. A pair of light fluxes achieved by deflecting the focal point detection light flux twice are guided to an image sensor to form a pair of subject images on the image sensor. The focal adjustment state is detected based upon the extent to which the pair of subject images are offset.

13 Claims, 25 Drawing Sheets

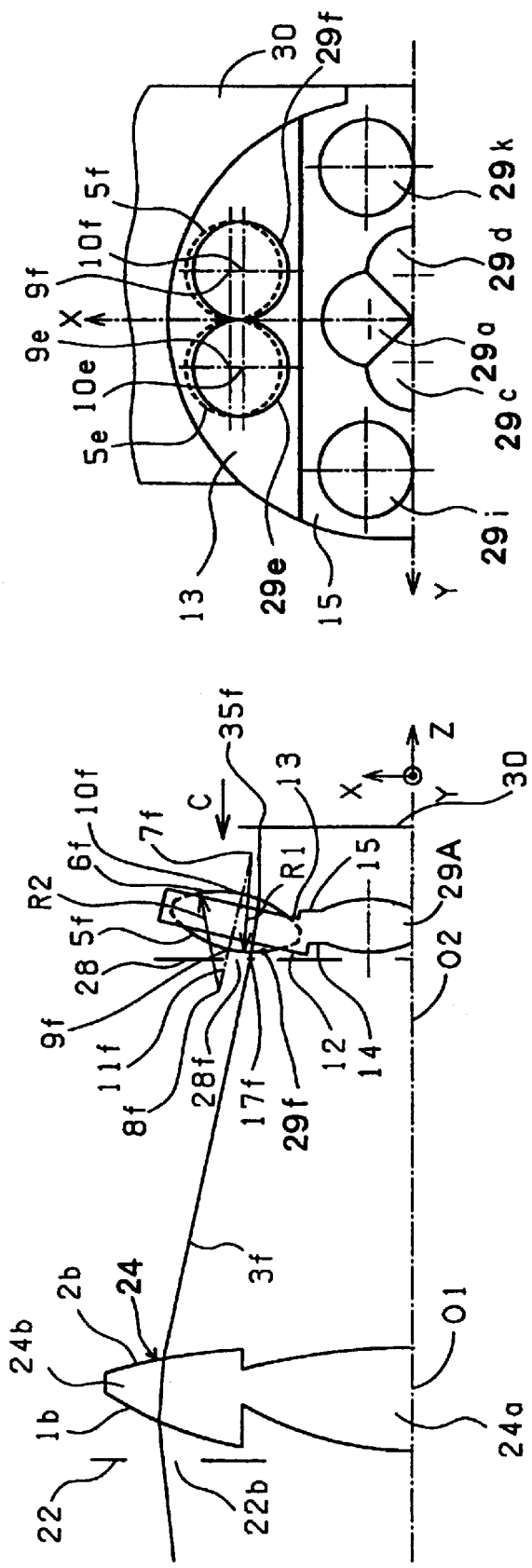

LIGHT FLUX OF OFF AXIS FOCAL POINT DETECTION AREA L

LIGHT FLUX OF OFF AXIS FOCAL POINT DETECTION AREA L

LIGHT FLUX OF OFF AXIS FOCAL POINT DETECTION AREA L

LIGHT FLUX OF OFF AXIS FOCAL POINT DETECTION AREA L : PRIOR ART

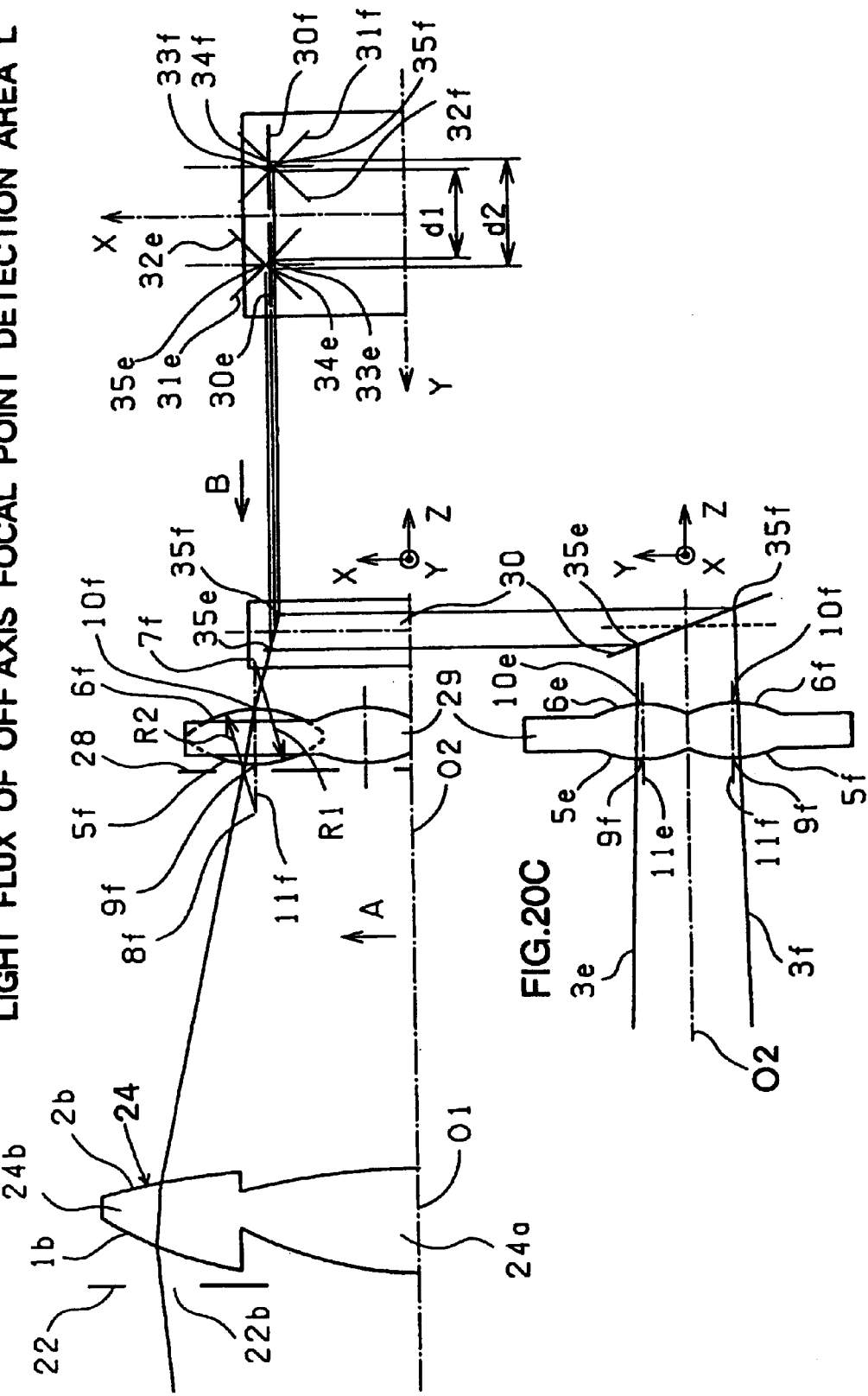

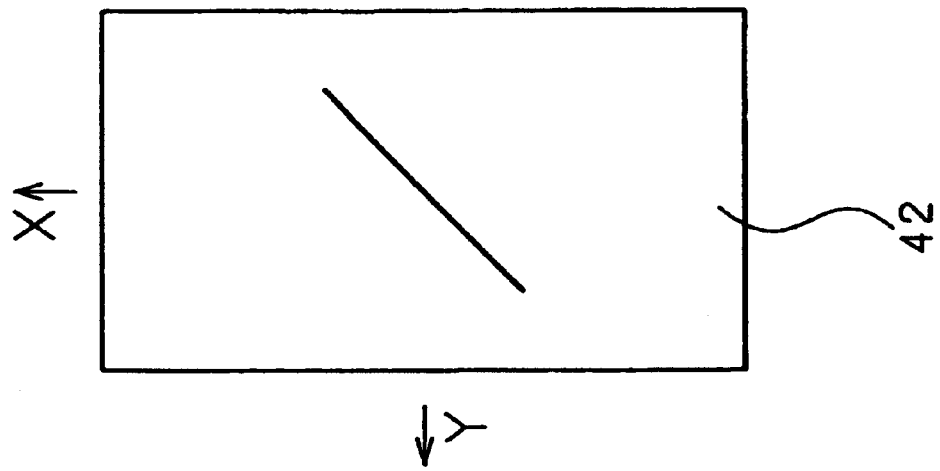
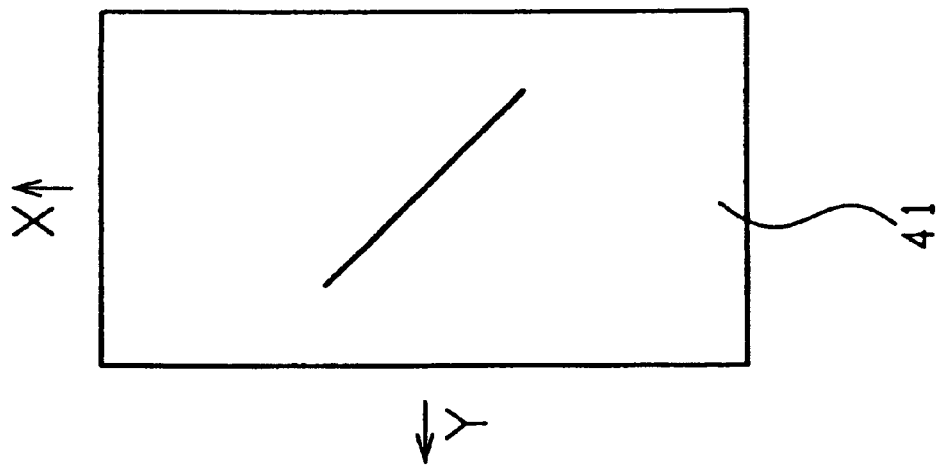

FOCAL POINT DETECTION APPARATUS AND FOCAL POINT DETECTION MODULE

This is a Continuation-in-Part of application Ser. No. 09/824,055 filed Apr. 3, 2001, abandoned. The entire disclosure of the prior application(s) is hereby incorporated by reference herein in its entirety.

INCORPORATION BY REFERENCE

The disclosures of the following priority applications are herein incorporated by reference:

Japanese Patent Application No. 2000-100947 filed Apr. 3, 2000

Japanese Patent Application No. 2000-133733 filed May 2, 2000

Japanese Patent Application No. 2000-206690 filed Jul. 7, 2000

Japanese Patent Application No. 2001-206599 filed Jul. 6, 2001

BACKGROUND OF THE INVENTION

1. Filed of the Invention

The present invention relates to a focal point detection apparatus that detects the focal adjustment state of a photographic optical system and a focal point detection module.

2. Description of the Related Art

Focal point detection apparatuses adopting the phase difference detection method in the known art include those having focal point detection areas set both on the optical axis and off the optical axis. Attempts to achieve a more compact unit and improve the detection accuracy have been made in the prior art, as explained below in reference to the focal point detection apparatuses presented as first~fourth prior art examples.

It is to be noted that such prior art technologies are described in, for instance, "Autofocusing Technology Adopted In Single Lens Reflex Cameras" included in "Optics" Vol. 18, No. 11 (published by Japan Optics Society, a section of the Applied Physics Society, in November, 1989).

In the first prior art example, a condenser lens is decentered relative to a field aperture so as to ensure that a focal point detection light flux having advanced off the axis of the photographic lens and then having passed through the field aperture, enters the condenser lens further outward relative to the photographic optical axis from the condenser lens center.

The second prior art example is disclosed in Japanese Laid-Open Patent Publication No. H 9-304691. In the second prior art example, a focal point detection light flux having advanced off the axis of the photographic lens is deflected toward the photographic optical axis by using a sub-mirror.

While a more compact focal point detection apparatus may be achieved by adopting the technology in the first or second prior art example, the so-called "squint" phenomenon becomes an issue to be addressed since focal point detection light fluxes resulting from pupil division diagonally enter a pair of focal point detection light-receiving elements from the same direction.

In the focal point detection apparatus in the third prior art example (see Japanese Laid-Open Patent Publication No. H 3-235906), an image sensor is rotatably held around an axis perpendicular to the direction along which the light-receiving element rows are arrayed at the image sensor and also perpendicular to the optical axis, in order to address the problem of the squint phenomenon. While the technology in the third prior art example eliminates the problem of the squint phenomenon manifesting in the third and second prior art examples, the focal point detection module is bound to become large.

The fourth prior art example (see Japanese Laid-Open Patent Publication No. H 9-243905) represents another method for solving the problem of the squint phenomenon. In the focal point detection apparatus in the fourth prior art example, a plurality of focal point detection light fluxes having advanced off the axis of the photographic lens are individually deflected at optimal angles to set them roughly parallel to the optical axis by using a sub-mirror.

SUMMARY OF THE INVENTION

An object of the present invention is to improve the detection accuracy while achieving miniaturization of the focal point detection apparatus and the focal point detection module having focal point detection areas set both on the optical axis and off the optical axis.

Another object of the present invention is to provide a focal point detection apparatus and a focal point detection module achieving simplification in the mechanism that holds the focal point detection light-receiving elements via an angle adjustment mechanism.

The present invention is adopted in a focal point detection apparatus that guides a pair of light fluxes originating from a subject, and then passing off the optical axis of a photographic optical system to an image sensor by a focal point detection optical system, forms a pair of subject images on the image sensor and detects the focal adjustment state of the photographic optical system based upon the degree to which the pair of subject images are offset. The objects described above are achieved by providing a first deflection member that is positioned between the photographic optical system and a predicted focal plane of the photographic optical system to deflect the pair of light fluxes from the subject having passed off the optical axis of the photographic optical system toward the optical axis and a second deflection member that deflects the pair of light fluxes from the subject which have been deflected by the first deflection member to allow them to advance substantially parallel to the optical axis, at the focal point detection optical system. The second deflection member may be set to one of the front and the rear of a field mask of the focal point detection optical system through which the subject light fluxes from the first deflection member are first transmitted.

The second deflection member may be provided behind a condenser lens of the focal point detection optical system.

The second deflection member may be constituted of a condenser lens included in the focal point detection optical system. In such a case, the focal point detection optical system should be constituted by ensuring that the principal ray of a focal point detection light flux enters at positions decentered from the optical axis of the condenser lens.

The present invention is also adopted in a focal point detection module having an optical axis of a focal point detection optical system, which comprises a condenser lens that condenses photographic light fluxes passing through a plurality of focal point detection areas set both on and off the axis within a photographic image plane, a pupil division mask that achieves pupil division by restricting each of the photographic light fluxes passing through the individual focal point detection areas at a pair of apertures, an image reforming lens unit that reforms images of the pair of light fluxes resulting from the pupil of division achieved at the pupil division mask and an image-capturing element that converts the pair of light fluxes the images of which have been reformed on a light-receiving surface by the image reforming lens unit to electrical signals and outputs the electrical signals.

In the focal point detection module, the objects described above are achieved by positioning the pair of apertures of the pupil division mask relative to off-axis lens portions so as to allow the pair of light fluxes achieved by dividing at the pupil division mask a light flux having passing through a focal point detection area to enter peripheral areas close to the optical axis of the focal point detection optical system in the off-axis lens portions corresponding to the focal point detection area among a plurality of lens portions included in the image reforming lens unit.

The off-axis lens portions each include an entry-side spherical surface and an exit-side spherical surface and when the line segment connecting the center of the entry-side spherical surface and the center of the exit-side spherical surface constitutes the optical axes of the off-axis lens portions, the projections achieved by projecting the optical axes of the off-axis lens portions onto a plane perpendicular to the direction of the pupil division should be roughly parallel to the optical axis of the focal point detection optical system and, in such a case, the positions of the centers of gravity of the pair of apertures may be set further toward the optical axis of the focal point detection optical system than the optical axis of the off-axis lens portions.

In the focal point detection module, it is preferable that curvatures each achieved in the entry-side spherical surface and the exit-side spherical surface of the off-axis lens portion are substantially equal to those of an on-axis lens portion included in the image reforming lens at which a focal point detection light flux on the optical axis enters and that a thickness of the off-axis lens portions in an optical axis direction is thicker than a thickness of said on-axis lens portion in the optical axis direction.

In the focal point detection module, one of the entry side and the exit side of the off-axis lens portions may be constituted of a non-spherical lens, instead.

When the off-axis lens portions at which the pair of light fluxes achieved by dividing at the pupil division mask a light flux having passed through an off-axis focal point detection area enter each includes an entry-side spherical surface and an exit-side spherical surface and the line segment connecting the center of the entry-side spherical surface and the center of the exit-side spherical surface constitutes the optical axes of the off-axis lens portions, the projections achieved by projecting the optical axes of the off-axis lens portions onto a plane perpendicular to the direction of the pupil division may be tilted at a predetermined angle relative to the optical axis of the focal point detection optical system so as to set the light fluxes exiting the off-axis lens portions roughly parallel to the optical axis of the focal point detection optical system.

The focal point detection optical system maybe structured as described below, instead. Namely, at each of the off-axis lens portions of the image reforming lens unit at which the pair of light fluxes achieved by dividing at the pupil division mask a light flux having passed through an off-axis focal point detection area enter, one of its entry side and its exit side may be constituted of a non-spherical lens with the projection achieved by projecting the axis of rotation symmetry of the non-spherical lens onto a plane perpendicular to the direction of the pupil division tilted at a predetermined angle relative to the optical axis of the focal point detection optical system so as to set the light fluxes exiting the off-axis lens portions roughly parallel to the optical axis of the focal point detection optical system.

The objects described above may be also achieved by providing an entry-side spherical surface and an exit-side spherical surface at each of the off-axis lens portions at which a pair of light fluxes achieved by dividing at the pupil division mask a light flux having passed through an off-axis focal point detection area enter, decentering the apex of the entry-side spherical surface and the apex of the exit-side spherical surface along a direction perpendicular to the direction of the pupil division to each other and constituting the surrounding area around the entry-side spherical surface and the exit-side spherical surface as a single flat surface shared with another lens portion.

Furthermore, the present invention may be adopted in a focal point detection apparatus comprising a first optical system that splits into two a light flux originating from a first focal point detection area set apart from the optical axis of a photographic lens by a first distance along a first direction and deflects the light flux at predetermined deflection angles toward the optical axis, a second optical system that splits into two a light flux from a second focal point detection area set away from the optical axis of the photographic lens by a second distance along a second direction, a pair of first focal point detection elements that receive the light fluxes resulting from the split achieved at the first optical system at angles corresponding to the individual deflection angles, a pair of second focal point detection elements that receive the light fluxes resulting from the split achieved at the second optical system and a means for holding that holds the first focal point detection elements and the second focal point detection elements on a single surface.

The object described above is achieved by setting the second distance shorter than the first distance, constituting the second optical system in such a manner that the light flux from the second focal point detection area is split into two and the light flux is deflected toward the optical axis at deflection angles smaller than the deflection angles set at the first optical system without deflecting the light flux or is split into two the light flux from the second focal point detection area without deflecting and providing an angle adjustment mechanism used to adjust the angle of the means for holding around the axis extending along the first direction to secure the means for holding to the apparatus main body.

The first direction extends along the long side of a rectangular photographic image plane, whereas the second direction extends along the short side of the photographic image plane.

BRIEF DESCRIPTION OF THE DRAWINGS

FIG. 10A illustrates a light flux entering an off-axis focal point detection area L at the focal point detection module 10 in the second embodiment;

FIG. 10B shows the light flux in FIG. 10A viewed from direction C;

FIG. 20A shows a light flux entering an off-axis focal point detection area at a focal point detection module in the prior art;

FIG. 20B shows the light flux in FIG. 20A viewed from direction B;

FIG. 20C shows the light flux in FIG. 20A viewed from direction A;

FIGS. 21A and 21B present diagonal charts;

DETAILED DESCRIPTION OF THE PREFERRED EMBODIMENTS

First Embodiment

The first embodiment achieved by adopting the focal point detection apparatus according to the present invention in a single lens reflex camera is now explained. In this focal point detection apparatus, a light flux originating from a subject which passes off the optical axis of a photographic optical system is deflected twice in the optical path of a focal point detection optical system. Namely, the off-axis focal point detection light flux is first deflected toward the optical axis by using a sub-mirror (a first deflection member) provided further toward the photographic optical system relative to a predicted focal plane and then it is deflected by using a second deflection member provided between the predicted focal plane of the photographic optical system and a condenser lens.

The following is a detailed explanation of the focal point detection apparatus achieved in the first embodiment, given in reference to FIGS. 1~5.

Figure 1:
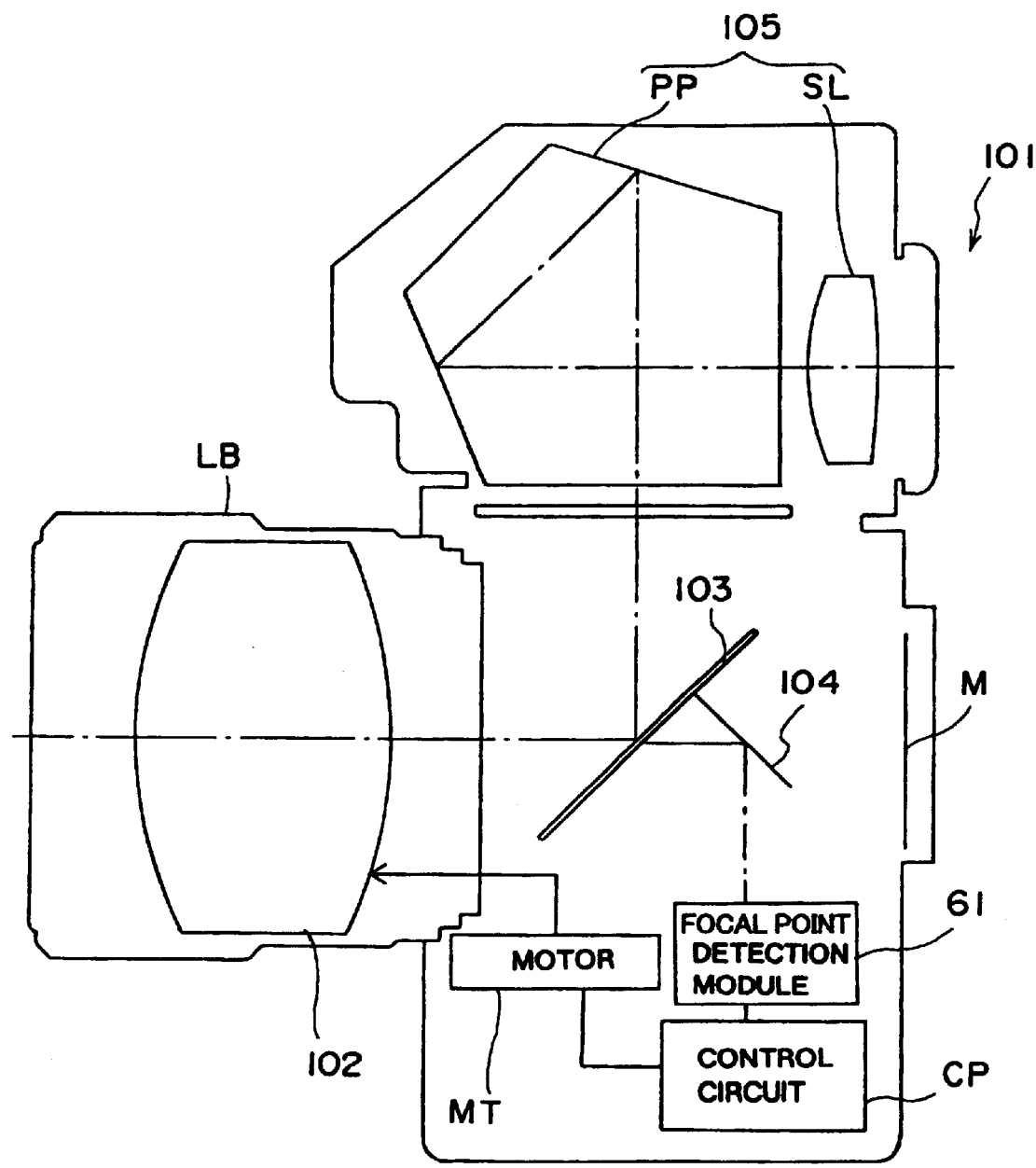
FIG. 1 is a sectional view of an autofocus single lens reflex camera internally provided with the focal point detection apparatus achieved in a first embodiment.

FIG. 1 schematically illustrates the structure of a single lens reflex camera 101 provided with the focal point detection apparatus according to the present invention. A light flux from the subject is guided into a camera body CB after having been transmitted through a photographic lens 102 inside a lens barrel LB. Some of the light flux guided into the camera body CB is allowed to be transmitted through a semi-transmissive main mirror 103 and reflected downward by a sub-mirror 104. It then enters a focal point detection module 61. A control circuit CP performs a focal adjustment for the photographic lens 102 by driving a lens drive motor MT in conformance to a focal point detection signal output by the focal point detection module 61. The light flux having been reflected at the main mirror 103, on the other hand, is observed through an eyepiece lens SL via a pentaprism PP. The pentaprism PP and the eyepiece lens SL constitute a viewfinder 105. M indicates the photographic image plane.

Figure 2:
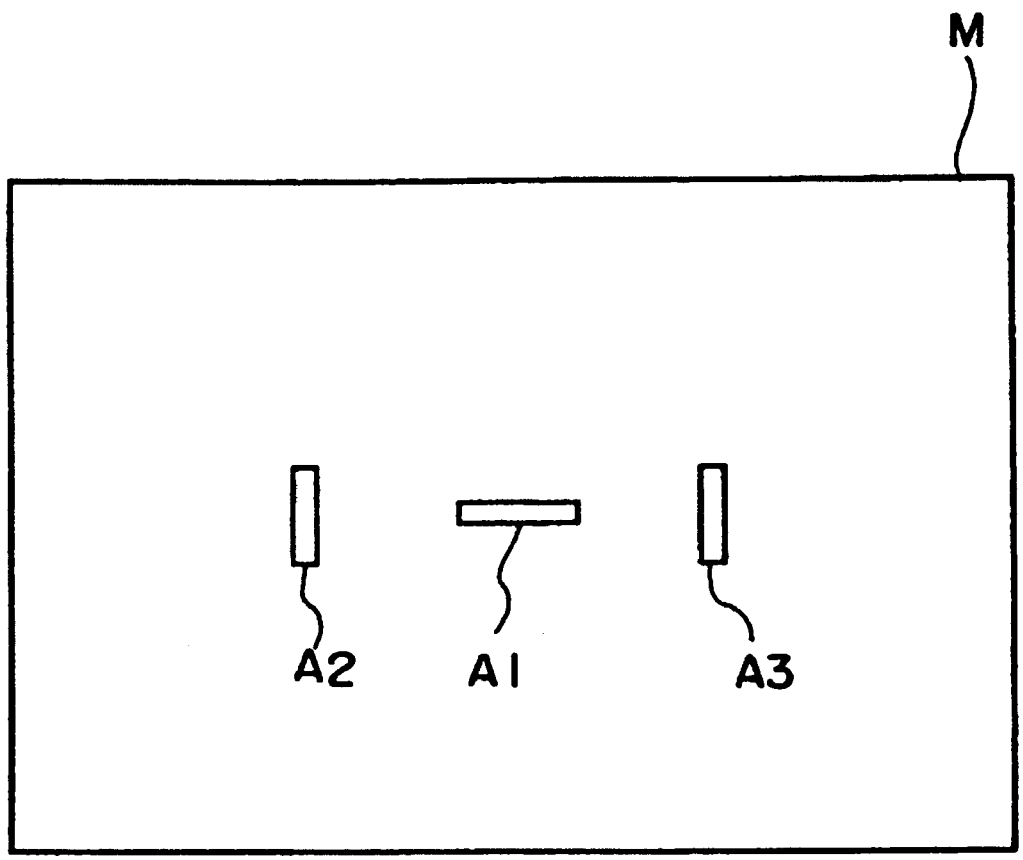
FIG. 2 shows the three focal point detection areas set within the photographic image plane in the first embodiment.

FIG. 2 shows the focal point detection areas set in the focal point detection apparatus in the first embodiment. In FIG. 2, M indicates the photographic image plane set at a surface where a subject image is to be formed by the photographic optical system and, as shown in the figure, the photographic image plane has a rectangular shape elongated along the horizontal direction. In this focal point detection apparatus, a focal point detection area A1 at the center of the photographic image plane M, which extends along the horizontal direction and focal point detection areas A2 and A3 at peripheral areas toward the left and right of the photographic image plane M, which extend along the vertical direction, are set.

Figure 3:
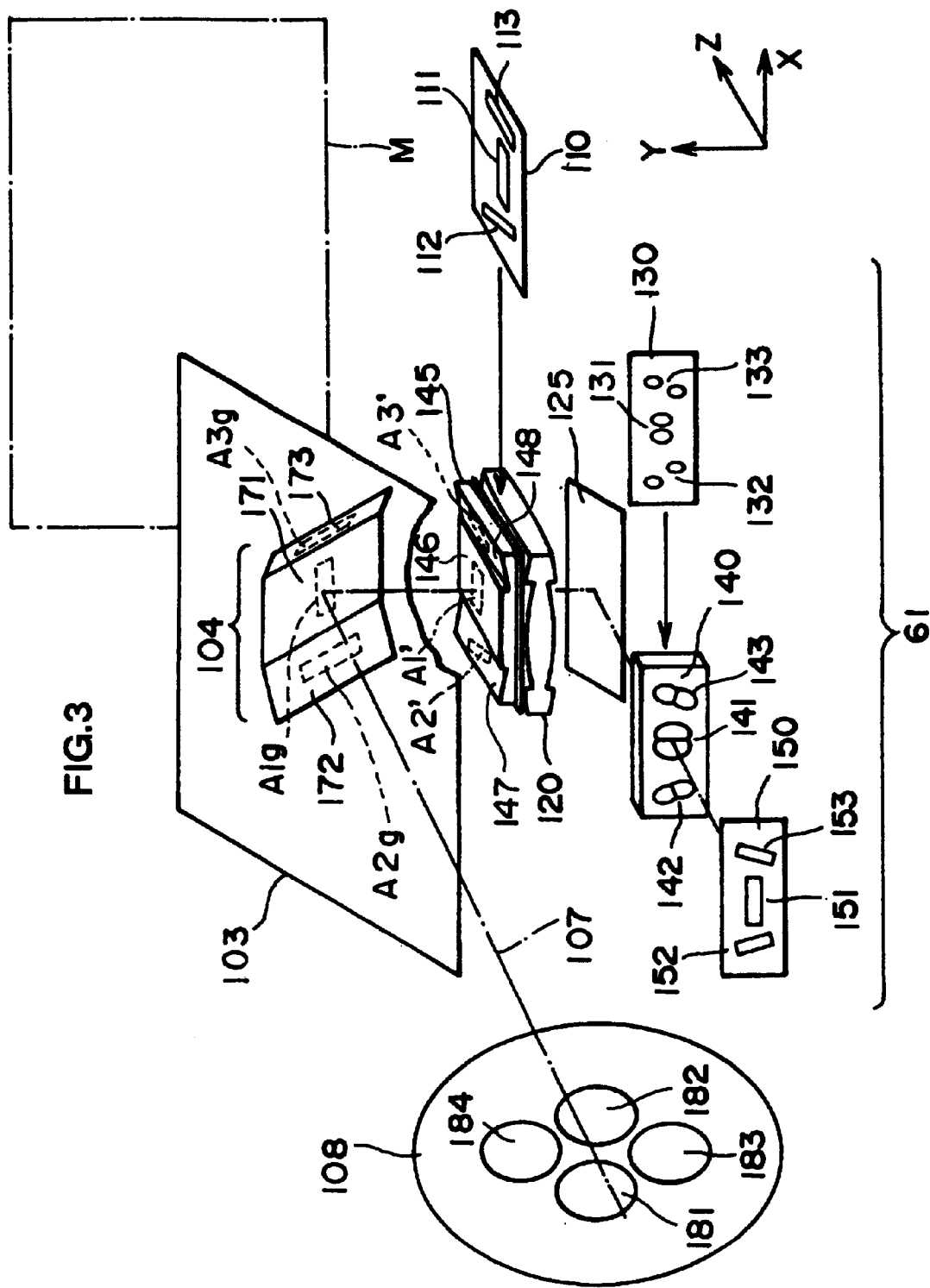
FIG. 3 is a perspective showing the inside of the autofocus single lens reflex camera internally provided with the focal point detection apparatus achieved in the first embodiment.

As shown in FIG. 3, the sub-mirror 104 includes three reflecting surfaces, i.e., a central reflecting surface 171 that reflects a focal point detection light flux reaching the focal point detection area A1 at the center of the photographic image plane in a specific direction (toward the camera bottom surface) and left and right reflecting surfaces 172 and 173 that reflect focal point detection light fluxes reaching the focal point detection areas A2 and A3 at the left and the right of the image plane along specific directions. The left and the right reflecting surfaces 172 and 173 are made to incline at specific angles relative to the central reflecting surface 171. By setting the left and right reflecting surfaces at specific angles in this manner, the light fluxes reaching the focal point detection areas A2 and A3 at the peripheral areas of the image plane are deflected toward a photographic optical axis 107.

Figure 4:
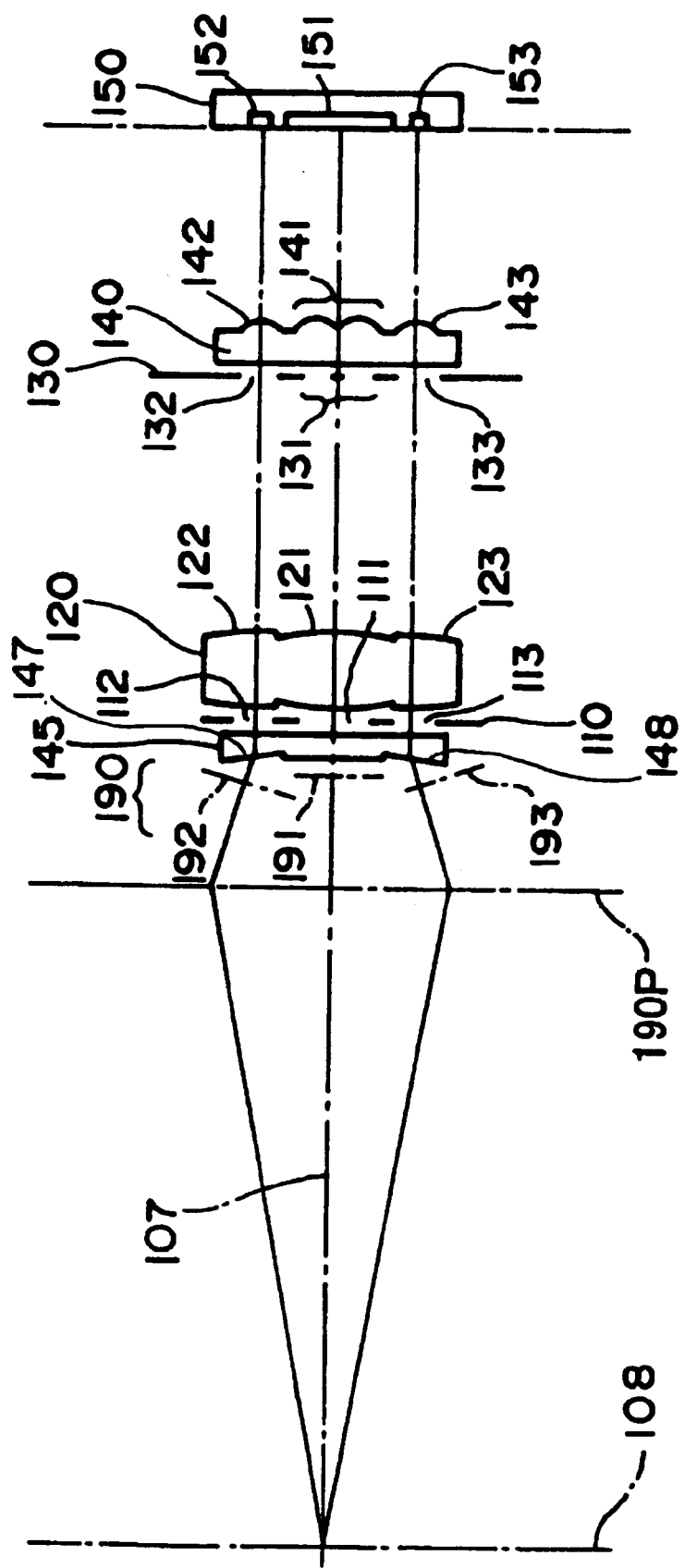
FIG. 4 illustrates the structure of the focal point detection optical system in the first embodiment.

As shown in FIGS. 3 and 4, the focal point detection module 61 comprises a second deflection member 145, a field mask 110, a condenser lens 120, a reflecting mirror 125, an aperture mask 130, an image reforming lens unit 140 and an image sensor 150. The focal point detection module 61 in the embodiment is achieved by packaging these optical elements as an integrated unit. The reflecting mirror 125, which is provided between the condenser lens 120 and the aperture mask 130, deflects a focal point detection light flux branching from a photographic light flux to allow the height of the camera bottom (along the direction in which the Y axis extends), to be reduced, thereby achieving miniaturization of the camera. In FIG. 3, reference numeral 108 indicates an exit pupil, reference numerals 181 and 182 indicate pupil areas corresponding to the focal point detection area A1 and reference numerals 183 and 184 indicates pupil areas corresponding to the focal point detection areas A2 and A3. The focal point detection module 61 is to be explained in detail in reference to FIG. 4.

In FIG. 3, the longitudinal axes of field apertures 112 and 113 at the field mask 110 are made to incline away from each other in direction +Z. The directions along which a pair of apertures 132 and a pair of apertures 133 are provided at the aperture mask 130, the directions along which a pair of lenses 142 and a pair of lenses 143 are provided at the image reforming lens unit 140 and the directions along which a pair of light-receiving elements 152 and a pair of light-receiving elements 153 are provided at the image sensor 150, are set so that they incline over an increasing distance from each other along the +Y axis. Their angles of inclination are determined in correspondence to the angles formed by the central reflecting surface 171 of the sub-mirror 104 and the other reflecting surfaces 172 and 173. Namely, the directions of lengths of projected images A2g and A3g achieved by reverse projecting the field apertures 112 and 113 onto the reflecting surfaces 172 and 173 match the direction of lines along which the reflecting surfaces 172 and 173 are bent from the reflecting surface 171.

Structure of Focal Point Detection Optical System

FIG. 4 illustrates the focal point detection optical system in the focal point detection module 61.

The focal point detection optical system in FIG. 4 performs a focal point detection by adopting a method in the known art which is referred to as either the phase difference detection method or the pupil division image reforming method. In this method, the focal adjustment state of the photographic optical system is detected based upon an offset manifesting in the positional relationship between a pair of images formed by a pair of light fluxes having passed through different areas of the exit pupil surface at the photographic optical system.

Although not shown in FIG. 4, the sub-mirror 104 is provided at a position 190P further toward the photographic lens 102 relative to a predicted focal plane 190. A focal point detection light flux having advanced along the photographic optical axis 107 of the photographic optical system and having been reflected at the central reflecting surface 171 of the sub-mirror 104 forms an image at a predicted focal plane 191 which constitutes a primary image forming plane where the primary image of the photographic light flux is formed. Focal point detection light fluxes having advanced off the optical axis of the photographic optical system and having been reflected at the left and right reflecting surfaces 172 and 173 of the sub-mirror 104 respectively form images at predicted focal planes 192 and 193, each constituting a primary image forming plane. In the explanation of the embodiment, these predicted focal planes 191~193 are categorically referred to as the predicted focal plane 190.

The focal point detection light fluxes having been deflected toward the photographic optical axis 107 by the left and right reflecting surfaces 172 and 173 of the sub-mirror 104 enter peripheral areas 147 and 148 (see FIG. 3) of a second deflection member 145, where they are deflected to move away from the optical axis due to the prism effect of the second deflection member 145, thereby becoming light fluxes having optical axes roughly parallel to the photographic optical axis 107.

Figure 5:
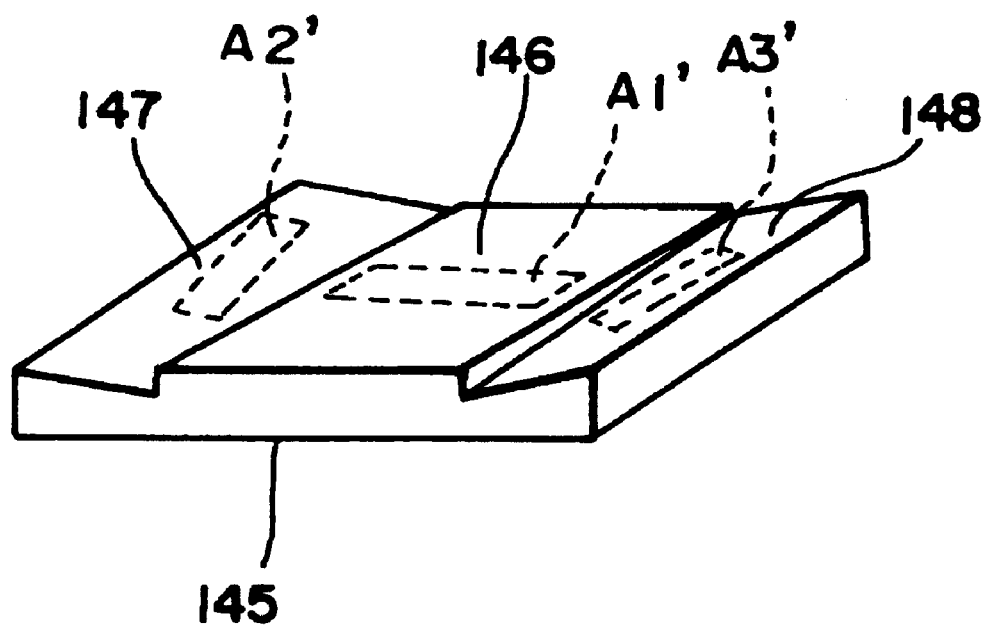
FIG. 5 is an enlarged perspective of the second deflection member.

The second deflection member 145 is now explained in detail in reference to FIG. 5. The second deflection member 145 is a transparent plastic member constituted by forming three prism pieces 146, 147 and 148 as an integrated unit. The prism pieces 146, 147 and 148 are formed in a wedge shape to deflect light along the directions represented by the vectors contained in planes perpendicular to the lengths of an A1 equivalent area A1', an A2 equivalent area A2' and an A3 equivalent area A3' respectively. They deflect light so as to set the axes of the light fluxes reaching the individual areas roughly perpendicular to a plane Q which contains two rectilinear lines representing the lengths of the A2 equivalent area A2' and the A3 equivalent area A3'.

The axes of the light fluxes reaching the individual areas extend perpendicular to the lengths of the corresponding areas, since the areas A1', A2' and A3' are optically equivalent to the focal point detection areas A1, A2 and A3. Accordingly, if the optical axes of these three light fluxes are all roughly perpendicular to a single plane Q, the lengths of the three areas extend roughly perpendicular to the perpendicular of the plane Q. Geometrically, this state can only be achieved if the lengths of the three areas are all roughly parallel to the plane Q.

In the embodiment, the lines along which the reflecting surfaces 172 and 173 are bent from the reflecting surface 171 are parallel to the YZ plane in FIG. 3 and forms a 45° angle with the Y axis. According to our geometrical observation, the image formed by the reflecting surface 172 onto the focal point detection area A2 of the image plane M is caused to incline from the XZ plane with the side of the image along its length which is closer to the photographic lens inclining upward along the vertical direction and inclining toward the photographic optical axis along the left/right direction. The image formed at the focal point detection area A3 is symmetrical to the image at the focal point detection area A2 relative to the YZ plane.

Even when these images are deflected along the directions represented by the vectors contained in the planes perpendicular to the directions in which their lengths extend as described above, they cannot be set parallel to the Z X plane since their lengths undergo parallel displacement. Thus, the plane Q cannot be set parallel to the Z X plane. If the length of the area A1 extends along the Y axis, as does the length of the area A2, for instance, the length of the image at the area A1 formed by the reflecting surface 171 is set parallel to the Z axis and, therefore, it cannot be parallel to the plane Q.

However, in the embodiment, the length of the area A1', too, is set parallel to the X axis in FIG. 3 and, ultimately, is set parallel to the plane Q, as well.

The focal point detection optical system is explained in further detail, again in reference to FIG. 4. The field mask 110 having field apertures 111, 112 and 113 for defining the three focal point detection areas A1, A2 and A3 is provided behind the second deflection member 145. To the rear of the field mask 110, the condenser lens 120 having three lens portions 121, 122 and 123 is provided. Behind the condenser lens 120, the aperture mask 130 having three pairs of aperture apertures 131, 132 and 133 is provided, with the image reforming lens unit 140 having three pairs of image reforming lens unit portions 141, 142 and 143 provided behind the aperture mask 130. To the rear of the image reforming lens unit 140, the image sensor 150 having three light-receiving portions 151, 152 and 153 is provided. The light-receiving portions 151~153 are each constituted of a pair of photoelectric conversion elements (not shown).

The principal plane of the condenser lens 120, the main surfaces of the aperture mask 130, the principal plane of the image reforming lens unit 140 and the light-receiving surface of the image sensor 150 all present to the rear of the field mask 110 are set so as to be optically equivalent to a plane parallel to the plane Q.

In other words, the principal plane of the condenser lens 120 is set parallel to the plane Q, whereas the aperture mask 130, the principal plane of the image reforming lens unit 140 and the light-receiving surface of the image sensor 150 are each set parallel to the plane on which the virtual image of the image plane Q is formed by a mirror 125.

It is to be noted that the illustration of the main mirror 103 and the sub-mirror 104, which are optical components of the focal point detection optical system and constitute the focal point detection apparatus together with the focal point detection module 61, is omitted in FIG. 4.

As described above, the first embodiment achieves the following advantages over the second prior art example.

In the second prior art example, the light fluxes reaching the focal point detection areas A2 and A3 at the peripheries of the photographic image plane are simply deflected toward the photographic optical axis 107 of the photographic optical system. In other words, the principal rays of the focal point detection light fluxes are not set parallel to the photographic optical axis. The focal point detection apparatus in the first embodiment, which sets the principal rays of the focal point detection light fluxes parallel to the photographic optical axis 107 by employing the second deflection member 145 prevents the principal rays of the focal point detection light fluxes from entering the image sensor 150 in diagonal directions unlike the focal point detection optical system in the second prior art example and, thus, the focal point detection error caused by the light-receiving surfaces of the image sensor 150 inclining around the X axis in FIG. 2 can be minimized.

In addition, in the focal point detection apparatus in the first embodiment, the principal rays of the focal point detection light fluxes enter from directions extending along the optical axis of the image reforming lens unit 140. In other words, the principal rays of the focal point detection light fluxes make entries perpendicular to the image reforming lens unit 140. As a result, any reduction in the optical performance attributable to oblique incidence of focal point detection light fluxes which poses a problem in the second prior art example can be prevented.

Furthermore, the second deflection member is constituted of an independent prism 145 in the first embodiment. Thus, since the focal point detection light fluxes enter the condenser lens along the optical axis and it is not necessary to deflect the axes of the principal rays with the condenser lens, the necessity for letting light fluxes pass through the peripheral areas of the lens as required in the first prior art example is eliminated. Instead, the central area of the lens is used, thereby making it possible to utilize the condenser lens 120 under conditions which achieve good optical performance.

Compared to the fourth prior art example in which focal point detection light fluxes are set parallel to the photographic optical axis by using a sub-mirror, the following advantages are achieved.

In the focal point detection optical system in the first embodiment, the focal point detection light fluxes are each deflected twice by the reflecting surfaces 172 and 173 of the sub-mirror 104 constituting the first deflection member and the peripheral prisms 147 and 148 of the second deflection member 145 to set the principal rays of the focal point detection light fluxes parallel to the photographic optical axis 107. Thus, the light-receiving portion 151 corresponding to the focal point detection area A1 at the center of the image plane and the light-receiving portions 152 and 153 corresponding to the focal point detection areas A2 and A3 at the left and the right of the image plane can be formed on an image sensor chip occupying only a small area, thereby achieving a reduction in the cost of the image sensor 120.

In addition, as long as distances between the optical axis and the focal point detection areas A2 and A3 at the peripheries of the image plane are equal in both the first embodiment and the fourth prior art example, the distance between the detection light fluxes corresponding to the two areas on the field mask is shorter in the focal point detection apparatus in the first embodiment compared to that in the optical system in the fourth prior art example described earlier. Namely, the dimensions of the field mask 110 can be reduced in the focal point detection optical system in the first embodiment, which makes it possible to reduce the width of the focal point detection module 61 in the vicinity of the predicted focal plane 190.

It is to be noted that in the first embodiment, the detection light fluxes to enter the focal point detection areas A2 and A3 at the peripheries of the image plane are set parallel by the second deflection member 145. However, the following variation may be adopted, instead. Namely, the focal point detection light fluxes may be set close to parallel by employing the second deflection member 145, if not completely parallel. The degree of the focal point detection error attributable to the so-called squint phenomenon in which focal point detection light fluxes enter a pair of light-receiving surfaces of the image sensor along diagonal directions is reduced as the angles of incidence become closer to a 90° angle. Thus, an advantage is achieved in that although complete parallelism is not achieved, the error attributable to oblique incidence can be reduced by the second deflection member 145.

For instance, the variation described above is ideal when the dimension of the length of the central focal point detection area A1 in the first embodiment is increased, which invariably lengthens the distance between the field apertures 112 and 113 corresponding to the peripheral focal point detection areas A2 and A3 on the field mask. When the variation is adopted, the chip dimensions of the image sensor can be reduced to a size comparable to that achieved in the first embodiment by tilting the light fluxes toward the center.

Variation in the Position of the Second Deflection Member

While the second deflection member 145 is provided toward the photographic optical system near the field mask 110 in the first embodiment, the second deflection member 145 may be provided behind the field mask 110 instead. Alternatively, it may be positioned behind the condenser lens 120. Since focal point detection light fluxes entering the condenser lens enter from diagonal directions as in the prior art in the latter case, the advantage of preventing any reduction in the optical performance attributable to oblique incidence is not achieved. However, it still achieves an advantage in that the squint phenomenon which would manifest at the image sensor light-receiving surfaces is completely eliminated or the seriousness of the phenomenon is reduced.

Variation in which the Second Deflection Member is also Used as a Condenser Lens In addition, while the second deflection member 145 in the first embodiment is constituted as an independent optical element, the function of the second deflection member 145 may be realized at the condenser lens 120. This may be achieved by decentering the optical axes of the lens portions 122 and 123 of the condenser lens 120 in FIG. 4 corresponding to the focal point detection areas at the peripheries of the photographic image plane away from the photographic optical axis 107 of the photographic optical system relative to the positions of the gravitational centers of the field apertures 112 and 113 and deflecting the principal rays of the focal point detection light fluxes to allow them to extend roughly parallel to the photographic optical axis 107. Namely, a structure achieved by reversing the structure in the first prior art example explained earlier in which the optical axes of the lens portions of the condenser lens corresponding to the focal point detection areas at the peripheries of the photographic image plane are decentered so as to set them closer to the optical axis of the photographic optical system relative to the positions of the gravitational centers of the field apertures 112 and 113 and the principal rays of the focal point detection light fluxes are thus deflected toward the optical axis is adopted. While the structure adopted in this variation does not prevent the reduction in the optical performance attributable to oblique incidence of light at the condenser lens or the reduction in the optical performance resulting from the use of an area of the condenser lens offset from its center, it eliminates the problem of the squint phenomenon or at least reduces the seriousness of the phenomenon without having to provide an independent second deflection member 145.

Variation of the Second Deflection Member

Unlike in the first embodiment described above in which the light flux corresponding to the focal point detection area A1 at the image plane center is deflected by the prism piece 146 of the second deflection member 145, the prism piece 146 may be replaced by a plane parallel plate. The central axis of the light flux immediately before reaching the second deflection member 145 is parallel to the Y axis in FIG. 3, the plane Q is slightly inclined relative to the X Z plane as mentioned earlier and thus, the central axis of the light flux leans slightly toward the side opposite from the photographic image plane M relative to the normal of the plane Q. Accordingly, the pair of aperture apertures 131 at the aperture mask 130, the pair of image reforming lens unit portions 141 at the image reforming lens unit 140 and the light-receiving portion 151 of the image sensor 150 should be moved further upward in FIG. 2 in correspondence to the inclination of the leaning central axis. With this variation, the light-receiving surface of the image sensor is parallel to the virtual image formed by the mirror provided at the plane Q and thus, it is almost perpendicular to the axes of the principal rays of the detection light fluxes entering the light-receiving portions 152 and 153 at the peripheries. At the same time, the axis of the principal rays of the detection light flux corresponding to the central focal point detection area which enters the light-receiving portion 151 is slightly offset from the direction extending perpendicular to the plane Q as explained earlier. Thus, the so-called squint phenomenon manifests with regard to this light flux, as explained in Japanese Laid-Open Patent Publication No. H 3-235906. As a result, a focal point detection error occurs if the image sensor 150 becomes tilted around the Y axis in FIG. 2, but since the angle of incidence has very little inclination, the resulting error is normally insignificant as well. In addition, the extent to which the optical characteristics at the individual lenses deteriorate due to oblique incidence at the condenser lens and the image reforming lens unit is insignificant enough to allow the variation to be effectively adopted in practical use.

Variation with Respect to Focal Point Detection Area

Figure 6:
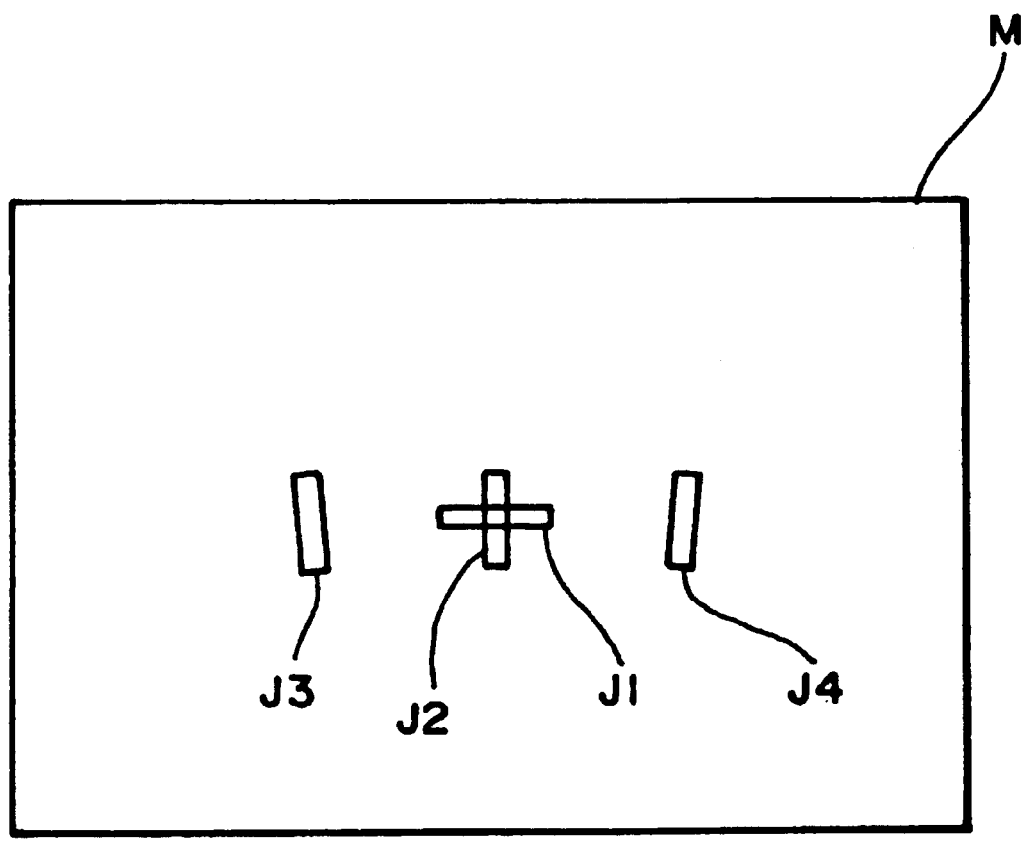
FIG. 6 shows another example in which four focal point detection areas are set within the photographic image plane.

While the focal point detection area A1 is set to extend along the horizontal direction at the center of the photographic image plane in the first embodiment, a cross shaped focal point detection area may be set at the center of the photographic image plane as shown in FIG. 6. In this example, a focal point detection area J1 extending along the horizontal direction and a focal point detection area J2 extending along the vertical direction are set at the center of the photographic image plane M, and focal point detection areas J3 and J4 extending roughly along the vertical direction are set at the left and right peripheries of the photographic image plane M over an increasing distance from each other as they extend upward. In the variation, the lengths of the images at the peripheral areas J3 and J4 formed by the sub-mirror peripheral reflecting surfaces are set parallel to the image formed by the sub-mirror central reflecting surface, by adopting the improved positional arrangement disclosed in Japanese Laid-Open Patent Publication No. H 9-243905. As a result, the lengths of the areas equivalent to the areas J3 and J4 achieved by deflecting the light fluxes along directions represented by vectors contained in the planes perpendicular to the lengths of the areas with the second deflection member 145 are set parallel to the image formed by the central reflecting surface.

Thus, the images at the predicted focal planes formed near the light-receiving surfaces corresponding to the individual areas can be set parallel while constituting the central portion of the second deflecting member with a plain parallel plate which does not have the prism effect, thereby enabling an accurate focal point detection. This variation which constitutes the central portion with a plane in parallel plate facilitates the process for machining the mold for the second deflecting member and, in addition, it eliminates the necessity for forming a wedge shaped prism piece having a relatively long inclined surface to prevent the thickness from becoming large and ultimately to prevent the apparatus from becoming large.

It is to be noted that in the improved arrangement mentioned above which is disclosed in the publication, a reflected light flux is divided along the line of intersection T of the "image plane Im which is a mirror reflection of the photographic image plane achieved by using the sub-mirror as the axis of symmetry" and the "light-receiving surface Z of the focal point detection element". Under these conditions, the lengths of the peripheral focal point detection areas J3 and J4 are not set vertically on the photographic image plane and instead, they extend upward over an increasing distance from each other, as explained earlier. Furthermore, while the apertures at the field mask corresponding to these peripheral areas achieve a greater degree of parallelism compared to that achieved when the lengths of the areas J3 and J4 are set vertically on the image plane, they are still positioned over a slightly smaller distance from each other toward the photographic optical system of the camera, as in the first embodiment.

In the first embodiment, the off-axis focal point detection light fluxes are deflected toward the photographic optical axis 107 by employing the sub-mirror 104 located further toward the photographic optical system relative to the predicted focal plane and then they are further deflected by the second deflection member 145 provided between the predicted focal plane 190 of the photographic optical system and the condenser lens 120. However, as long as a focal point detection light flux from the subject which passes off the optical axis of the photographic optical system is deflected twice within the optical path of the focal point detection optical system to set the principal ray of the focal point detection light flux parallel to the photographic optical axis or roughly parallel to the photographic optical axis, the means for deflection does not need to assume the mode achieved in the first embodiment.

Second Embodiment

Figure 7:
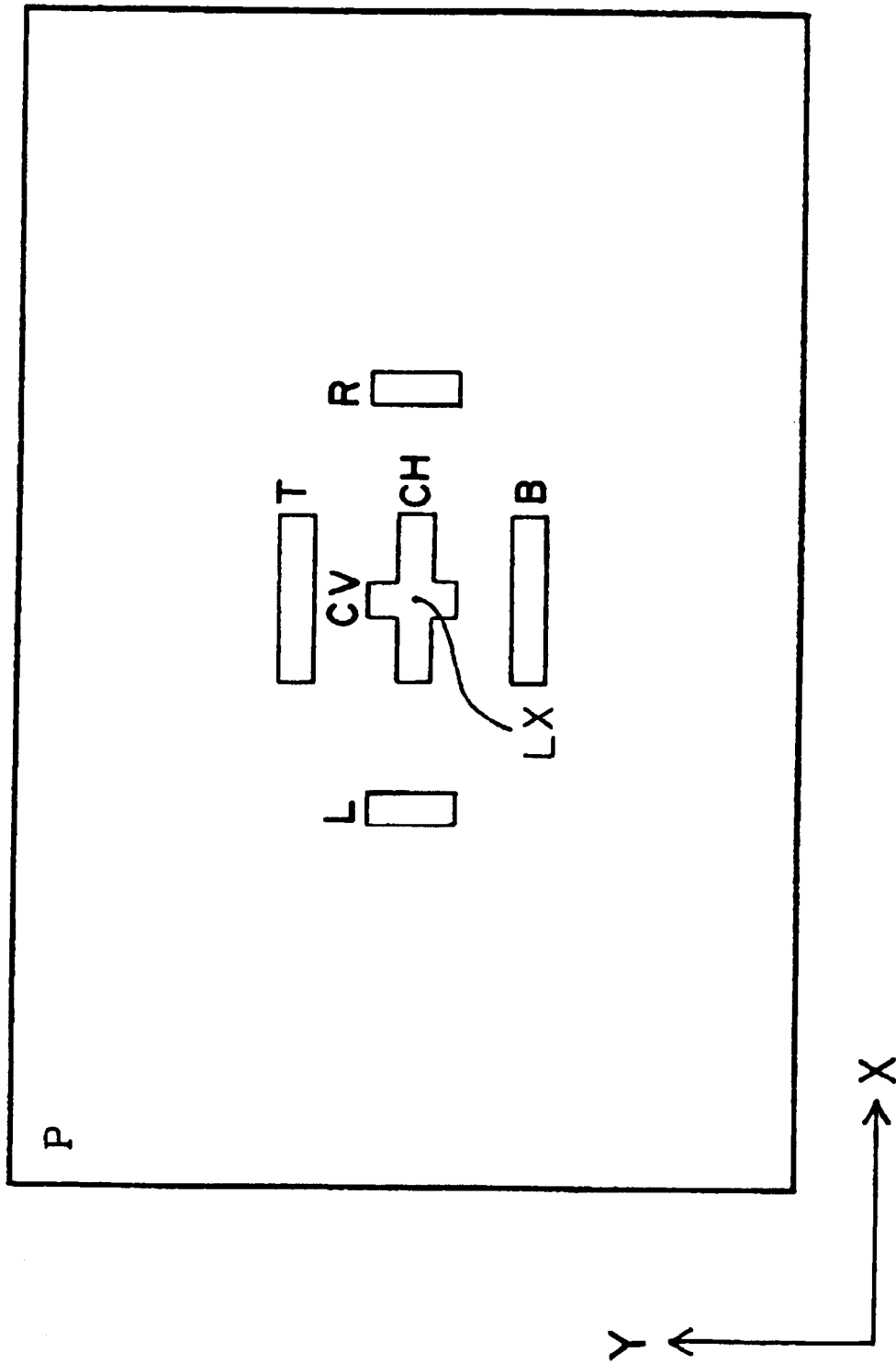
FIG. 7 shows six focal point detection areas set within the photographic image plane in a second embodiment.

In the second embodiment, a focal point detection is performed over the following six focal point detection areas shown in FIG. 7.

1. An area CH extending along the horizontal direction around a central optical axis LX.
2. An area CV extending along the vertical direction (the direction extending perpendicular to the area CH) around the optical axis LX.

The areas above are referred to as on-axis areas.

3. An area L extending along the vertical direction, over a distance from the optical axis LX to the left (a first direction: the direction along which the long side of the photographic image plane extends).
4. An area R extending along the vertical direction, over a distance from the optical axis LX to the right (a first direction: the direction along which the long side of the photographic image plane extends).
5. An area T extending along the horizontal direction, over a distance from the optical axis LX toward the top (a second direction: the direction along which the short side of the photographic image plane extends).
6. An area B extending along the horizontal direction, over a distance from the optical axis LX toward the bottom (the second direction: the direction along which the short side of the photographic image plane extends).

The four areas listed above are referred to as off-axis areas.

As shown in the figure, the distance between the top and bottom off-axis areas T and B and the optical axis LX (a second distance) is smaller than the distance between the left and right off-axis areas L and R and the optical axis LX.

In the second embodiment, lens portions which are located further toward the peripheries than the lens portions of the condenser lens for condensing the light fluxes for the areas T and B are utilized to condense the light fluxes for the areas L and R at the condenser lens, in order to tilt the light fluxes for the areas L and R closer to the central optical axis. As a result, a more compact image sensor chip is achieved. These focal point detection areas are set in conformance to the structure adopted in a focal point detection module 61A shown in the FIG. 8.

Figure 8:
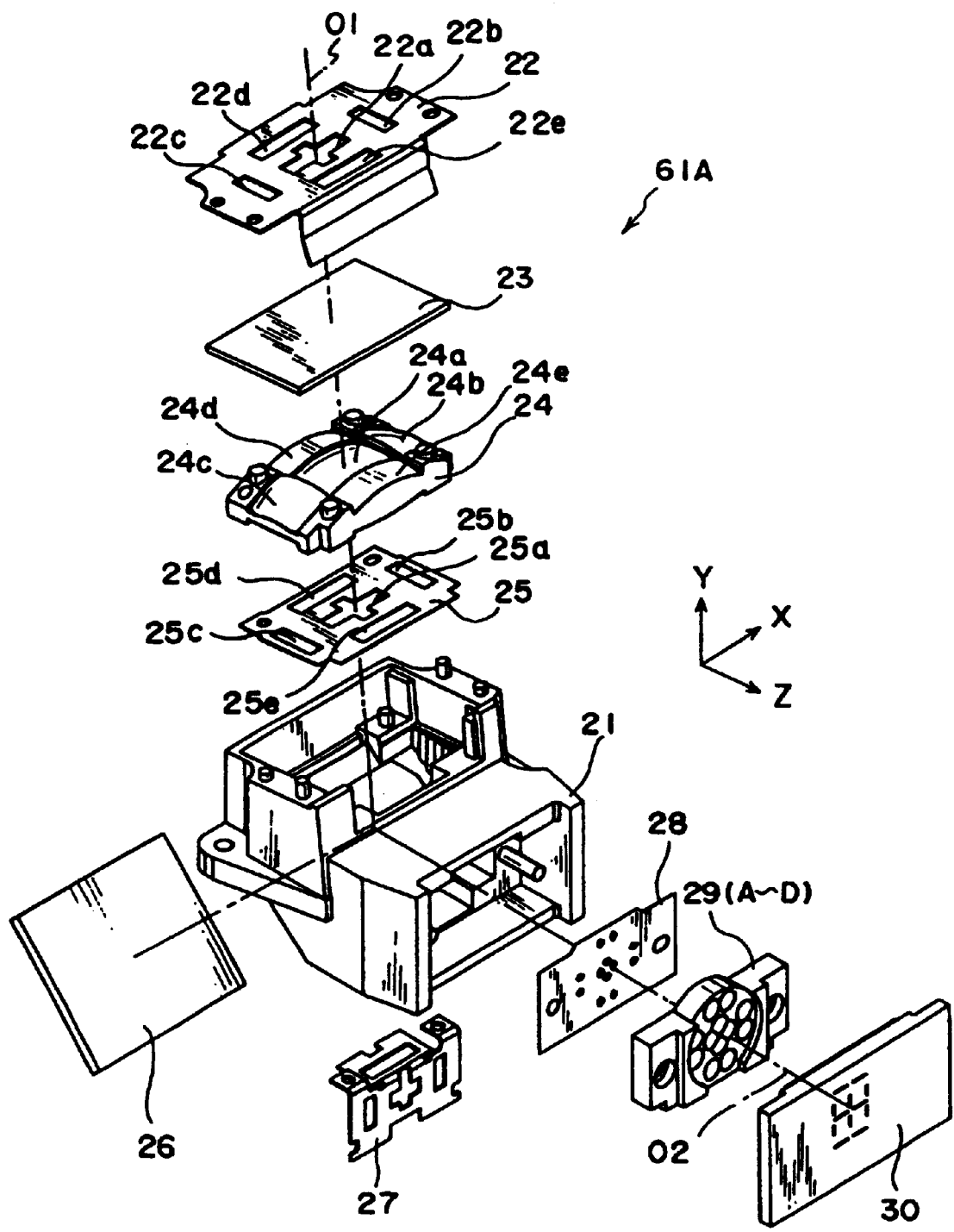
FIG. 8 is an exploded perspective showing the structure adopted in the focal point detection module in the second embodiment.

As illustrated in FIG. 8, the focal point detection module 61A which performs a focal point detection through a phase difference detection method in the known art comprises a field mask 22, an infrared clipping filter 23, a condenser lens 24, a light-blocking mask 25 for eliminating stray light, a reflecting mirror 26, a light-blocking mask 27 for eliminating stray light, an aperture mask 28, an image reforming lens unit 29 (29A~29D) and an image sensor chip 30, all of which are held at a holder 21 as an integrated unit. The field mask 22 includes an aperture 22a which corresponds to the on-axis areas CH and CV, and apertures 22b, 22c, 22d and 22e respectively corresponding to the off-axis focal point detection areas L, R, T and B, as shown in the figure. The condenser lens 24 and the light-blocking mask 25 respectively include lens portions 24a~24e and apertures 25a~25e, both in correspondence to the apertures 22a~22e of field mask 22. The lens portions 24a~24e of the condenser lens 24 guide light fluxes having entered through the apertures 22a~22e of the field mask 22 to the aperture mask 28.

Figure 9:
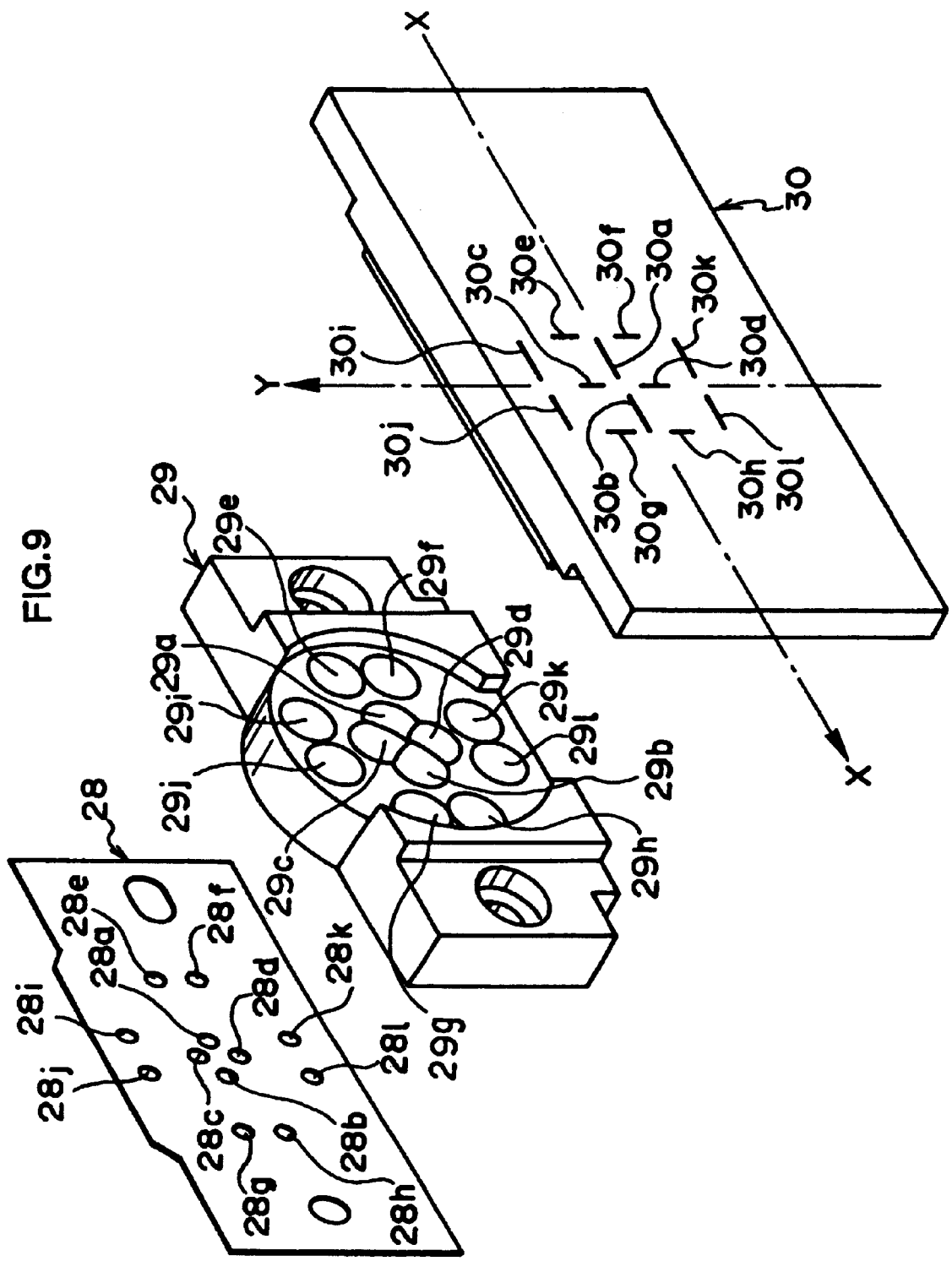
FIG. 9 is an enlargement of part of the focal point detection module in FIG. 8.

As shown in the enlargement presented in FIG. 9, the aperture mask 28 includes a pair of apertures 28a and 28b, a pair of apertures 28c and 28d and a pair of apertures 28e and 28f, a pair of apertures 28g and 28h, a pair of apertures 28i and 28j and a pair of apertures 28k and 28l, with individual pairs provided in correspondence to the six focal point detection areas H~B, whereas the image reforming lens unit 29 includes a pair of lens portions 29a and 29b, a pair of lens portions 29c and 29d, a pair of lens portions 29e and 29f, a pair of lens portions 29g and 29h, a pair of lens portions 29i and 29j and a pair of lens portions 29k and 29l with each pair made to correspond to one of the six focal point detection areas H~B. In addition, the image sensor chip 30 holds a pair of image sensor arrays (image-capturing elements) 30a and 30b, a pair of image sensor arrays 30c and 30d a pair of image sensor arrays 30e and 30f, a pair of image sensor arrays 30g and 30h, a pair of image sensor arrays 30i and 30j and a pair of image sensor arrays 30k and 30l, which also correspond to the six focal point detection areas, on a single plane. Each light flux entering the aperture mask 28 is divided into a pair of light flux. Namely, the aperture mask 28 performs a pupil division, and guides the resulting pair of light fluxes to the image reforming lens unit 29. It is to be noted that the image reforming lens unit is manufactured through injection molding by using resin.

Now, the second embodiment is explained in reference to FIGS. 10A and 10B. FIGS. 10A and 10B illustrate a light flux that enters the off-axis focal point detection area L of the focal point detection module 61A. FIG. 10B shows the light flux in FIG. 10A viewed from direction C. In FIG. 10A, the illustration of the infrared clipping filter 23, the lightblocking mask 25 for eliminating stray light, the reflecting mirror 26 and the lightblocking mask 27 for eliminating stray light is omitted for simplification, with the field mask 22, the condenser lens 24, and the aperture mask 28, the image reforming lens unit 29A and the image sensor chip 30 shown on a single straight line in the illustration.

In FIGS. 10A and 10B, the apertures 28e and 28f of the aperture mask 28, the lens portions 29e and 29f of the image reforming lens 29A and a pair of light fluxes 3e and 3f corresponding to the off-axis focal point detection area L overlap along the direction perpendicular to the sheet on which the figures are drawn. Since the light flux from the off-axis focal point detection area L defined by the aperture 22b of the field mask 22 travels through the lens portion 24b of the condenser lens 24, which is off the optical axis O2 of the focal point detection optical system, the split light fluxes 3e and 3f (more strictly speaking, the light fluxes that project the apertures 28e and 28f toward the photographic lens) are deflected toward the optical axis O2 and enter the lens portions 29e and 29f of the image reforming lens unit 29A. It is to be noted that FIGS. 10A and 10B show the elements and the optical path assigned with reference character f. For purposes of simplification, the following explanation focuses on the elements and the optical path assigned with reference character f as well.

Since the condenser lens 24 deflects the light fluxes from the off-axis focal point detection area L toward the optical axis O2, the image sensors 30e and 30f can be positioned close to the optical axis O2 even though the position of the off-axis focal point detection area L is relatively far from the optical axis O2, to achieve miniaturization of the image sensor chip 30. However, if the sensor arrays 30e and 30f are mounted at an angle along the rotational direction around the X axis in FIG. 10A relative to the light fluxes, a focal point detection error occurs when the light fluxes 3e and 3f enter the sensor arrays 30e and 30f from diagonal directions as described above. Accordingly, the occurrence of such a focal point detection error is prevented through the following measures in the second embodiment.

In FIG. 10A, the lens portion 29f of the image reforming lens unit 29A is tilted toward the optical axis O2. The lens portion 29f includes an entry-side spherical surface 5f and an exit-side spherical surface 6f. The entry-side spherical surface 5f and the exit-side spherical surface 6f are made to curve over radii R1 and R2 from their centers 7f and 8f respectively. A line segment 11f connecting the center 7f of the entry-side spherical surface 5f and the center 8f of the exit-side spherical surface 6f, i.e., the optical axis 11f of the lens portion 29f, is tilted within the plane (the X Z plane) perpendicular to the direction of the pupil division (direction Y) relative to the optical axis O2 of the focal point detection optical system. In other words, the projection achieved by projecting the optical axis 11f of the lens portion 29f onto the XZ plane perpendicular to the direction of the pupil division is made to tilt at a specific angle relative to the optical axis O2 of the focal point detection optical system. In addition, a gravitational center 17f of the aperture mask opening 28f is decentered toward the optical axis O2 relative to the optical axis 11f of the lens portion 29f. It is to be noted that in FIG. 10A, 9f indicates the apex of the entry-side spherical surface 5f and 10f indicates the apex of the exit-side spherical surface.

In the focal point detection optical system structured as described above, the light flux 3f having been deflected toward the optical axis O2 at the condenser lens portion 24b enters a peripheral area of the lens portion 29f close to the optical axis O2. Thus, the light flux having entered the lens portion 29f becomes refracted toward the optical axis 11f, and the light flux 3f exiting the lens portion 29f advances roughly parallel to the optical axis O2 of the focal point detection optical system to enter the image sensor array 30f. As a result, the subject image formed on the image sensor array 30f does not become offset along direction X even when the image sensor chip is tilted around the X axis, and the focal point detection accuracy is not compromised. It is to be noted that the tilt angle of the lens portion 29f and the position of the gravitational center 17 of the opening 28f relative to the lens portion 29f are set so as to ensure that the light exiting the lens portion 29f advances parallel to the optical axis O2.

It is to be noted that, although not shown, the image reforming lens unit portions 29g and 29h and the apertures 28g and 28h of the aperture mask 28 corresponding to the off-axis focal point detection area R facing opposite the detection area L over the optical axis O2 achieve physical shapes and positional relationships identical to those assumed by the image reforming lens unit portions 29e and 29f and the apertures 28e and 28f of the aperture mask 28 corresponding to the off-axis focal point detection area L.

Third Embodiment

Figure 11A:
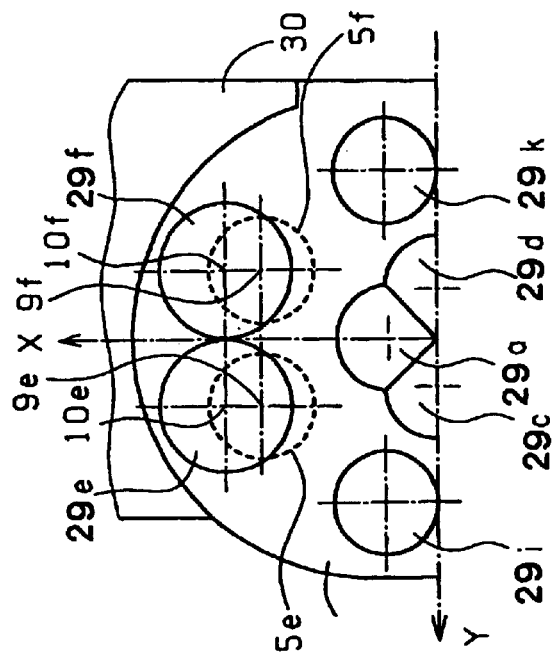
FIG. 11A illustrates a light flux entering an off-axis focal point detection area L at the focal point detection module 10 in a third embodiment.
Figure 11B:
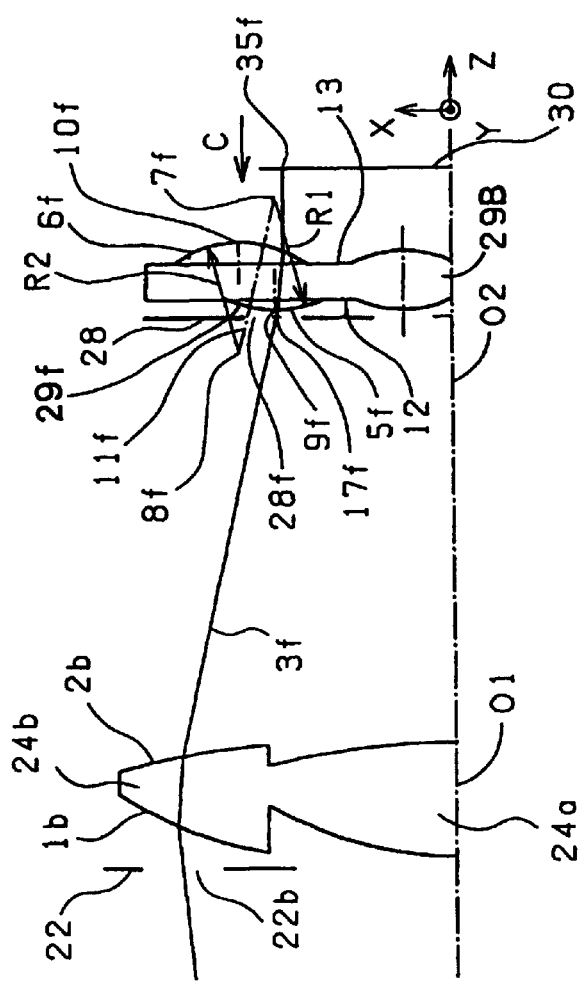
FIG. 11B shows the light flux in FIG. 11A viewed from direction C.

FIGS. 11A and 11B illustrate the focal point detection module achieved in the third embodiment. A lens portion 29f of an image reforming lens unit 29B includes an entry-side spherical surface 5f and an exit-side spherical surface 6f as in the second embodiment. An apex 9f of the entry-side spherical surface 5f and an apex 10f of the exit-side spherical surface 6f are offset along a direction (direction X) perpendicular to the direction of the pupil division (direction Y). With respect to the principal ray 3f, the line segment 11f connecting the center 7f of the entry-side spherical surface 5f and the center 8f of the exit-side spherical surface 6f, i.e., the optical axis 11f of the lens portion 29f, is made to tilt within the plane (the XZ plane) perpendicular to the direction of the pupil division (direction Y) relative to the optical axis O2 of the focal point detection optical system, since the entry side and exit side of the lens portion 29f are constituted as spherical surfaces 5f and 6f. It is to be noted that in the third embodiment, too, the degree to which the spherical surfaces 5f and 6f of the lens portion 29f are decentered and the position of the gravitational center 17f of the aperture mask opening 28f are set so as to ensure that the light flux exiting the lens portion 29f advances parallel to the optical axis of the focal point detection optical system. As in the second embodiment, the entry-side spherical surface 5f and the exit-side spherical surface 6f are made to curve over radii R1 and R2 from their centers 7f and 8f.

In the case of the image reforming lens unit 29B in the third embodiment, the projection achieved by projecting the optical axis 11f of the lens portion 29f onto the X Z plane perpendicular to the direction of the pupil division is tilted at a predetermined angle relative to the optical axis O2 of the focal point detection optical system. Thus, the lens portion 29f is optically equivalent to the lens portion 29f achieved in the second embodiment, and the light flux 3f exiting the lens portion 29f advances roughly parallel to the optical axis O2 of the focal point detection optical system and enters the image sensor array 30f at an almost right angle in the third embodiment as the light flux exiting the lens portion 29f in the second embodiment. Consequently, the risk of an error occurring with regard to the focal point detection accuracy is low even when the image sensor chip 30 is mounted at an angle around the X axis.

In addition, an area 13 around the entry-side spherical surface 5f and the exit-side spherical surface 6f of the lens portion 29f may be constituted of a single flat surface shared with one of the other lens portions 29a, 29b, . . . , and, in such a case, no stages are formed between the flat surfaces 13 and 15 and between the flat surfaces 12 and 14 unlike in the second embodiment. Since an extremely high degree of accuracy is required at the lens surfaces when forming an image reforming lens unit with the die, the die is processed with a so-called ultra-precise lathe. When machining the die used to form the lens surfaces 9f and 10f of the image reforming lens unit 29A in the second embodiment, the direction along which the main axis of the ultra-precise lathe extends must be changed from the direction in which it is set when machining a die used to form another lens surface. This necessitates two different types of dies for lens surface formation to be combined in a post process, presenting the possibility of lowered lens surface accuracy. The third embodiment, on the other hand, which does not require a change in the direction of the main axis when machining the die used to form the lens surfaces, achieves an improvement in the lens surface machining accuracy.

Fourth Embodiment

Figure 12B:
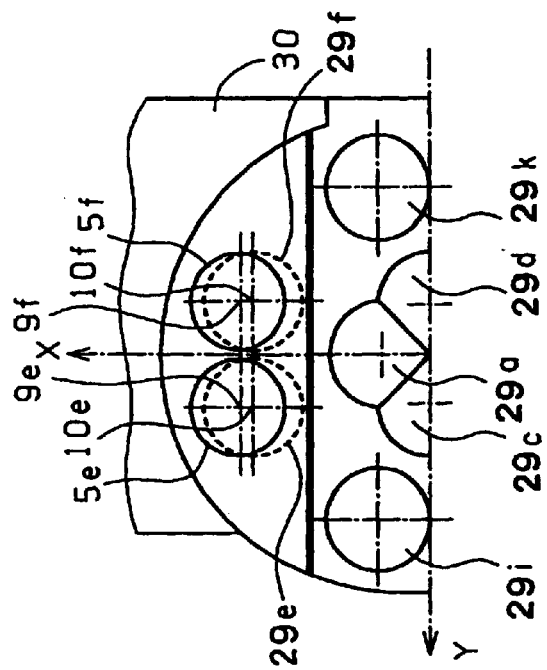
FIG. 12B shows the light flux in FIG. 12A viewed from direction C.
Figure 12A:
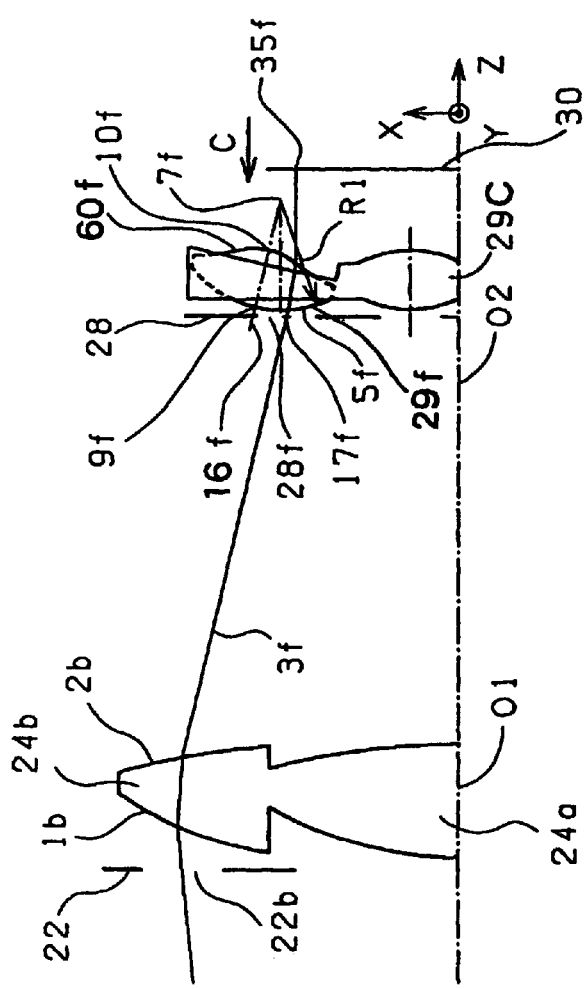
FIG. 12A illustrates a light flux entering an off-axis focal point detection area L at the focal point detection module 10 in a fourth embodiment.

FIGS. 12A and 12B illustrate the focal point detection module achieved in the fourth embodiment. While a lens portion 29f of an image reforming lens unit 29 C includes an entry-side spherical surface 5f as in the second embodiment, its exit side is constituted of a non-spherical surface 60f. The projection achieved by projecting an axis of rotational symmetry 16f of the non-spherical lens portion 60f onto the XZ plane perpendicular to the direction of the pupil division (direction X) is made to tilt at a specific angle relative to the optical axis O2 of the focal point detection optical system. The tilt angle of the axis of rotational symmetry 16f and the position of the gravitational center 17f of the opening 28f of the aperture mask 28 in this embodiment, too, are determined so as to ensure that the light flux exiting the lens portion 29f advances parallel to the optical axis O2 of the focal point detection optical system, as in the embodiments explained earlier. Furthermore, the entry-side spherical surface 5f is made to curve over the radius R1 from its center 7f which is set on the axis of rotational symmetry 16f of the non-spherical lens portion 60f.

In the focal point detection module in the fourth embodiment structured as described above, too, the light flux exiting the lens portion 29f is made to advance roughly parallel to the optical axis O2 of the focal point detection optical system as in the second and third embodiments. Thus, the risk of an error occurring with regard to the focal point detection accuracy is eliminated even when the image sensor chip 30 is mounted at an angle around the X axis as described above.

Fifth Embodiment

Figure 13A:
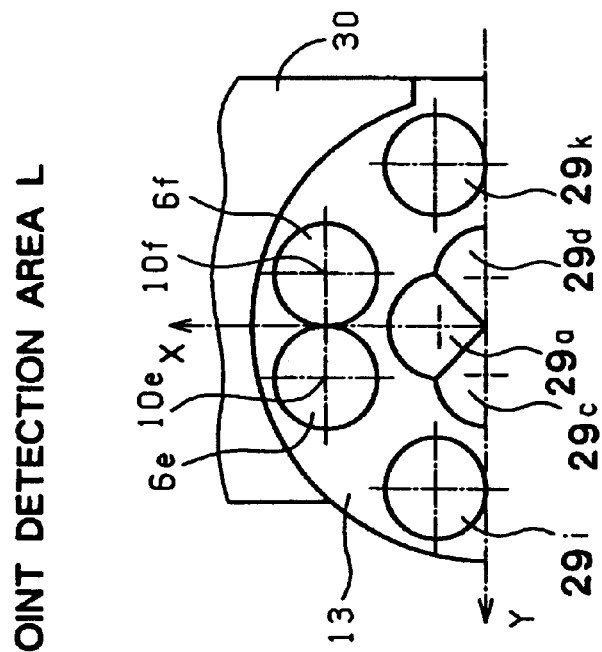
FIG. 13A illustrates a light flux entering an off-axis focal point detection area L at the focal point detection module 10 in a fifth embodiment.
Figure 13B:
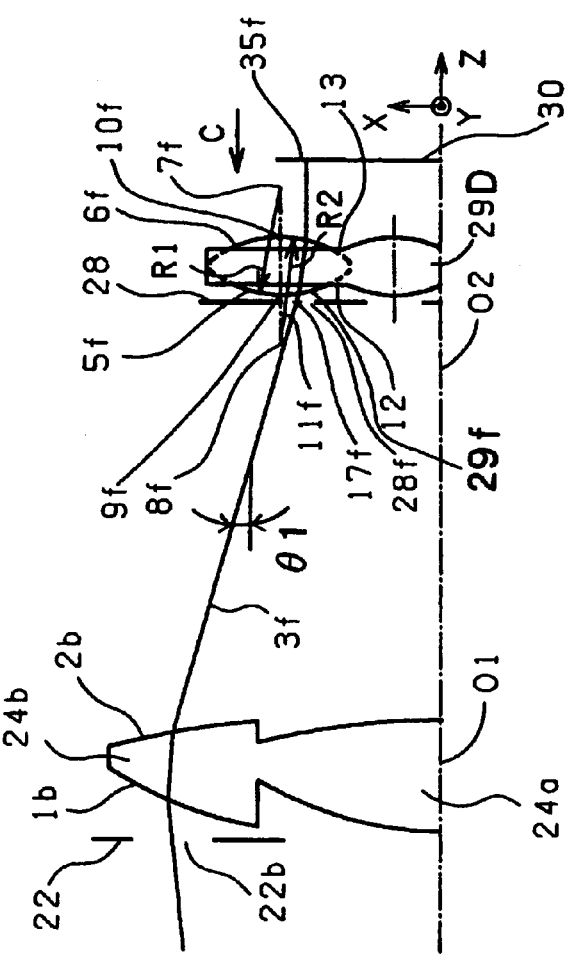
FIG. 13B shows the light flux in FIG. 13A viewed from direction C.

FIGS. 13A and 13B illustrate the focal point detection module achieved in the fifth embodiment. A lens portion 29f of an image reforming lens unit 29D includes an entry-side spherical surface 5f and an exit-side spherical surface 6f. The line segment connecting the center 7f of the entry-side spherical surface 5f and the center 8f of the exit-side spherical surface 6f represents an optical axis 11f of the lens portion 29f. In the fifth embodiment, a light flux 3f resulting from a division achieved at the aperture mask opening 28f is made to enter a peripheral area of the lens portion 29f, which is further toward the optical axis O2 of the focal point detection optical system. Namely, the position of the gravitational center 17f of the opening 28f of the aperture mask 28 is set further toward the optical axis O2 of the focal point detection optical system relative to the optical axis 11f of the lens portion 29f, to ensure that the light flux having entered the lens portion 29f from a diagonal direction exits roughly parallel to the optical axis O2 of the focal point detection optical system.

In the focal point detection module in the fifth embodiment structured as described above, too, the light flux 3f resulting from the division achieved at the opening 28f of the aperture mask 28 enters a peripheral area of the lens portion at 29f, which is set further toward the optical axis O2 of the focal point detection optical system. Thus, the light flux having entered the lens portion 29f becomes refracted toward the optical axis 11f, to allow the light flux 3f exiting the lens portion 29f to advance roughly parallel to the optical axis O2 of focal point detection optical system and enter the image sensor array 30f. As a result, the subject image formed on the image sensor array 30f does not become offset along direction X and therefore, the focal point detection accuracy is not compromised, even when the image sensor chip 30 is mounted at an angle around the X axis.

Sixth Embodiment

Figure 14:
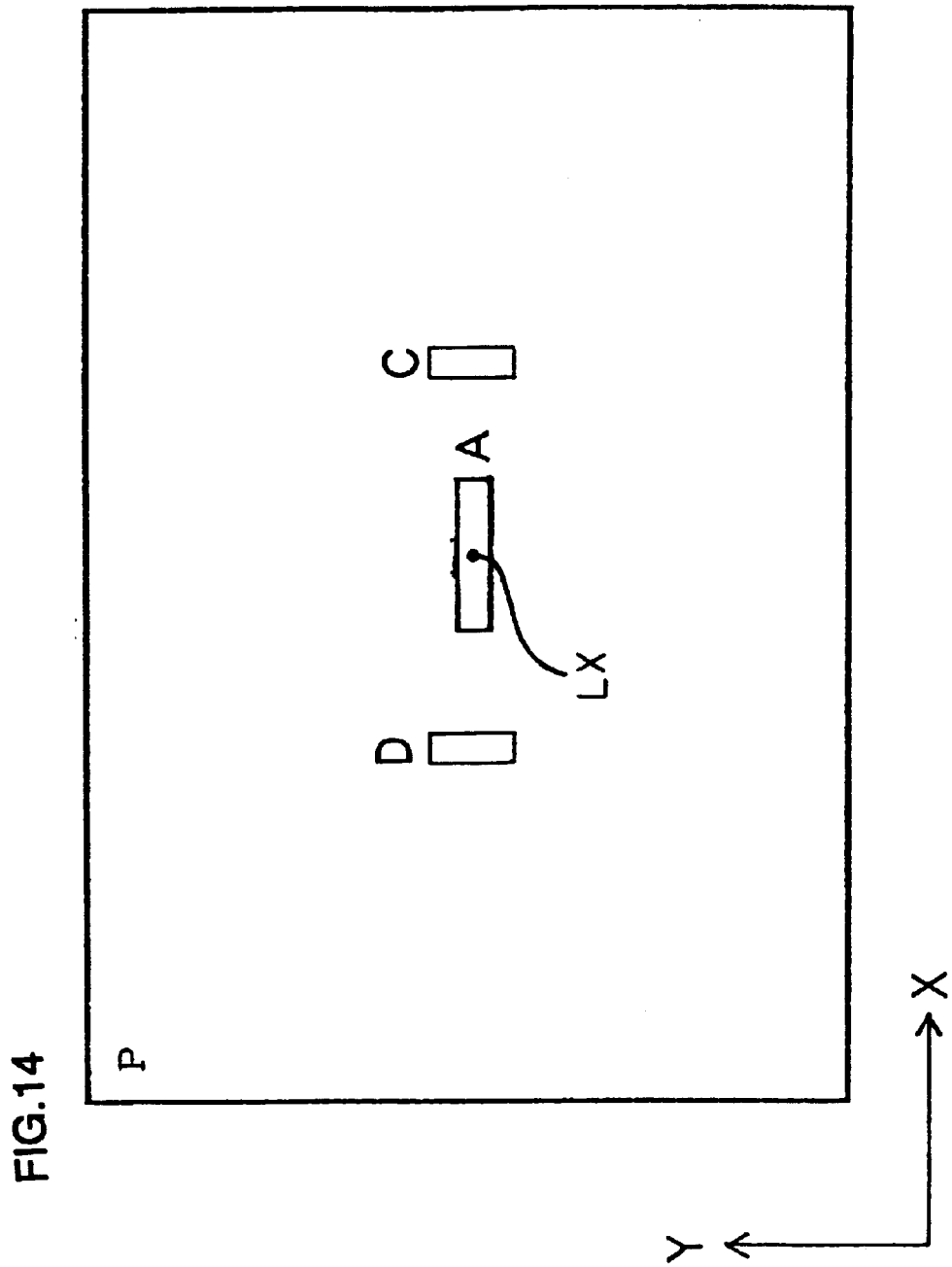
FIG. 14 shows the three focal point detection areas set within the photographic image plane at the focal point detection module in a sixth embodiment.

FIGS. 14–17A and 17B illustrate the focal paint detection module achieved in the sixth embodiment. As shown in FIG. 14, three focal point detection areas, namely a focal point detection area A set on-axis and focal point detection areas C and D set off-axis, are set in the focal point detection module achieved in this embodiment. The positions of gravitational center of pair of the openings 1128e, 1128f, 1128g and 1128h of an aperture mask 1128 are set further toward the optical axis O2 of the focal point detection optical system relative to the optical axes of the off-axis lens portions 1129e, 1129f, 1129g and 1129h so as to achieve the miniaturization along the x axis of the image sensor chip 1130 in a similar manner with the focal point detection module in the fifth embodiment as detailed later with FIG. 16. The focal point detection module in the sixth embodiment mainly differs from the focal point detection module in the fifth embodiment in a couple of points as follows.

(1) Three focal point detection areas A, C and D are set in the sixth embodiment, while six focal point detection areas A–F are set in the fifth embodiment.

(2) In the sixth embodiment, the refractive power of the off-axis lens portions 1124b and 1124c of the condenser lens 1124 is made stronger so that the light fluxes exited from the off-axis lens portions 1124b and 1124c are deflected toward the optical axis O2 at an angle θ100 larger than that of the fifth embodiment.

Figure 15:
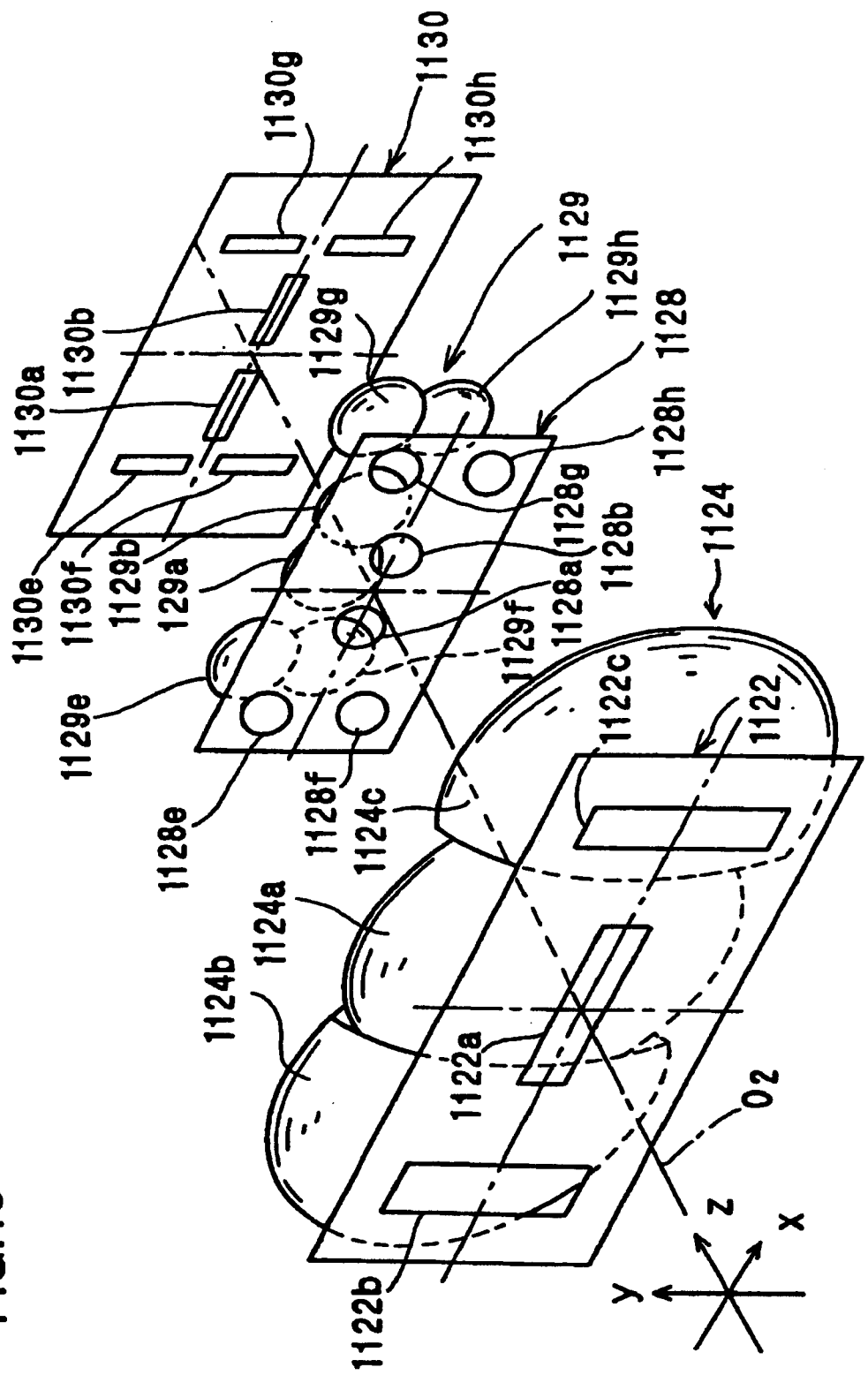
FIG. 15 is an exploded perspective showing the structure adopted in the focal point detection module in the sixth embodiment.
Figure 16:
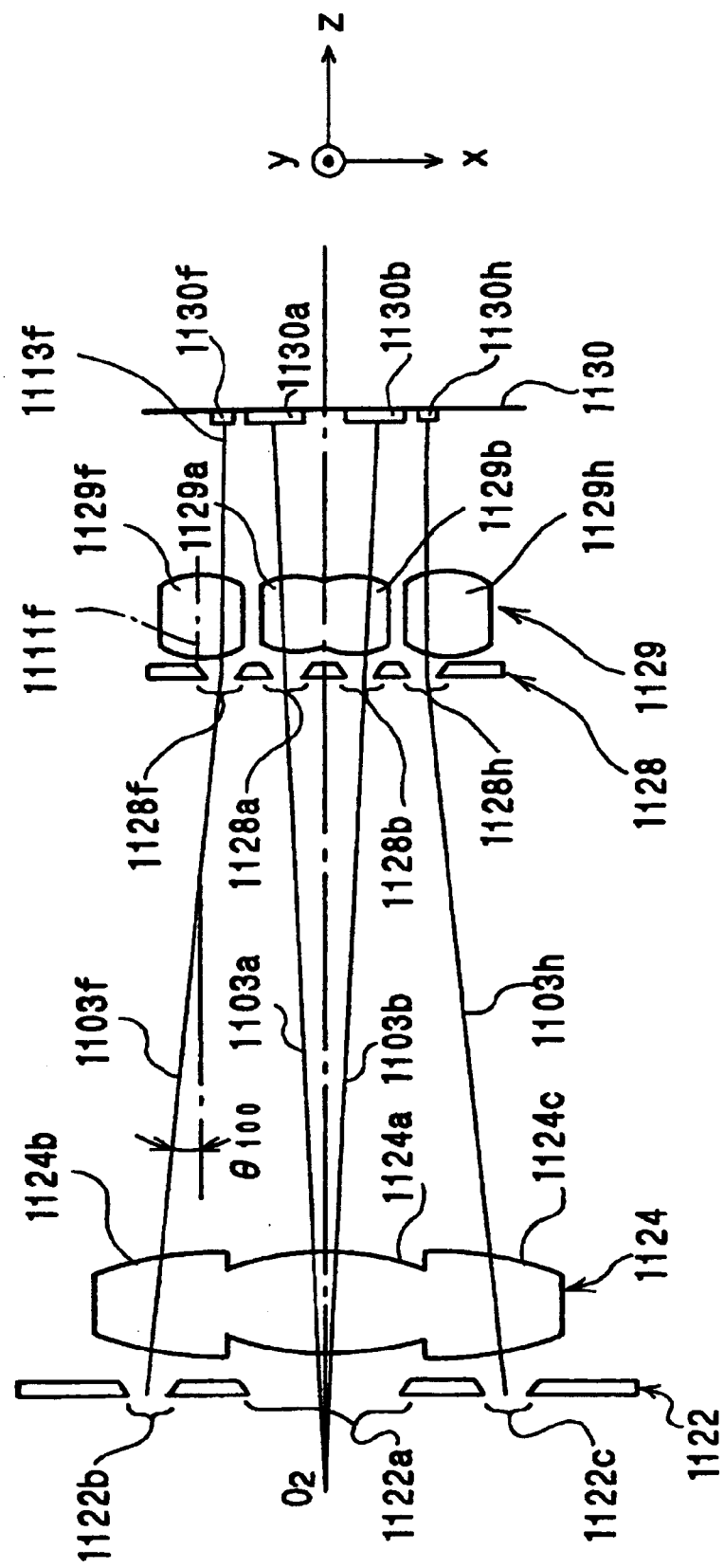
FIG. 16 shows a light flux entering an off-axis focal point detection area C at the focal point detection module in the sixth embodiment.

In FIGS. 15–17A, 17B, the members similar to the FIGS. 8, 9, 13A and 13B are indicated with the numerals in 1100th. For instance, condenser lens 24 is shown with a numeral 1124 and the image reforming lens 29 is shown with a numeral 1129. FIG. 15 is a perspective showing the focal point detection optical system in correspondence to FIGS. 8 and 9. FIG. 16 shows a structure in the X–Z plane achieved in the focal point detection module in correspondence to FIGS. 13A and 13B. The explanation will be given to the light flux entering the off-axis lens portion 1124b of the condenser lens 1124 referring to the explanation of FIGS. 13A and 13B.

As detailed above, the positions of gravitational center of pair of the openings 1128e, 1128f, 1128g and 1128h are decentered further toward the optical axis O2 of the focal point detection optical system relative to the optical axis 1111 f of the off-axis lens portions 1129e, 1129f, 1129g and 1129h as shown in FIG. 16. The light flux having been exited from the lens portion 1124b set off-axis and entered the lens portion 1129f of the image reforming lens 1129 is made to deflected toward the optical axis 1111f of the lens portion 1129. Therefore, the light flux 1113f having been exited from the lens portion 1129 becomes substantially parallel to the optical axis O2 of the focal point detection optical system and proceeds to enter the image sensor array 1130f. As a result, the subject image formed on the image sensor array 1130f has no displacement along the x-axis direction so that the focal point detection accuracy is not deteriorated, even if the image sensor chip 1130 is provided at a tilt relative to the x-axis.

Figure 17A:
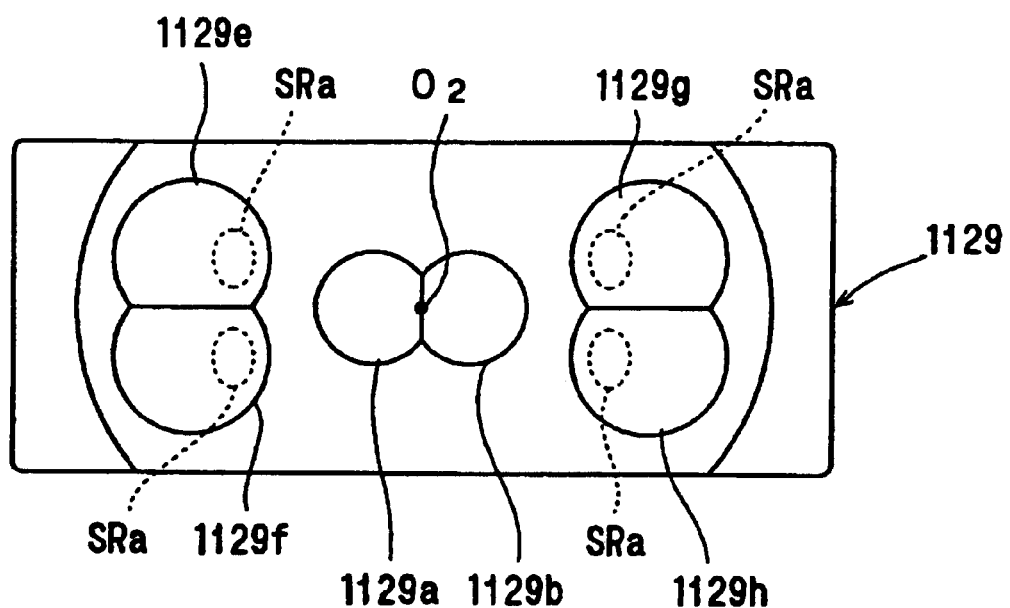
FIG. 17A is a front view of an image reforming lens in the sixth embodiment.
Figure 17B:
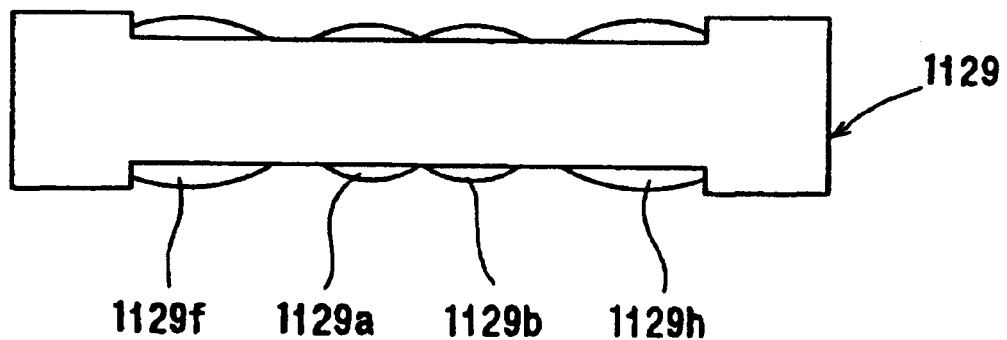
FIG. 17B is a plan view showing the bottom of the image reforming lens in the sixth embodiment.
Figure 18A:
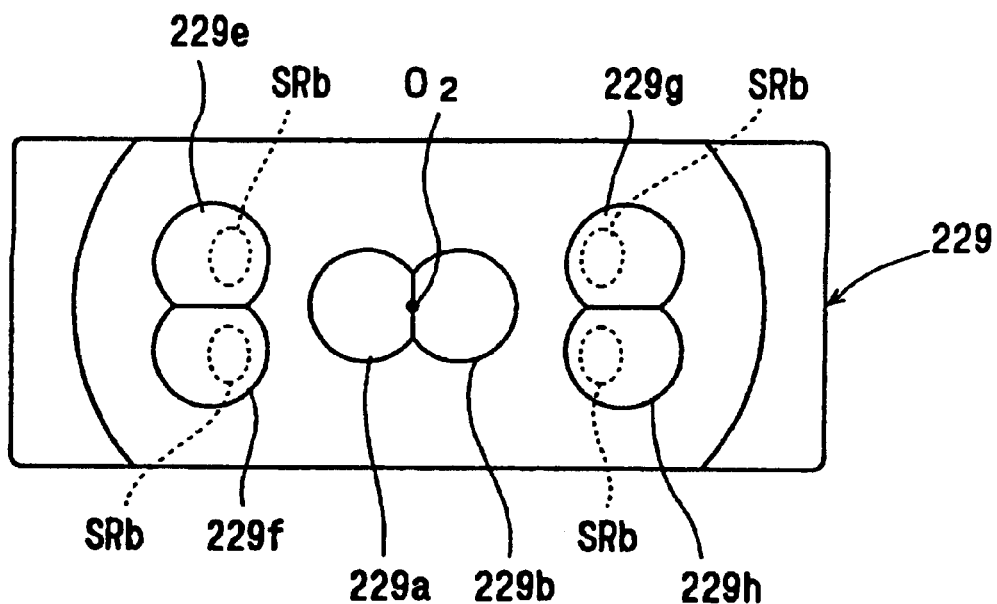
FIG. 18A is a front view of an image reforming lens in correspondence with the fifth embodiment.
Figure 18B:
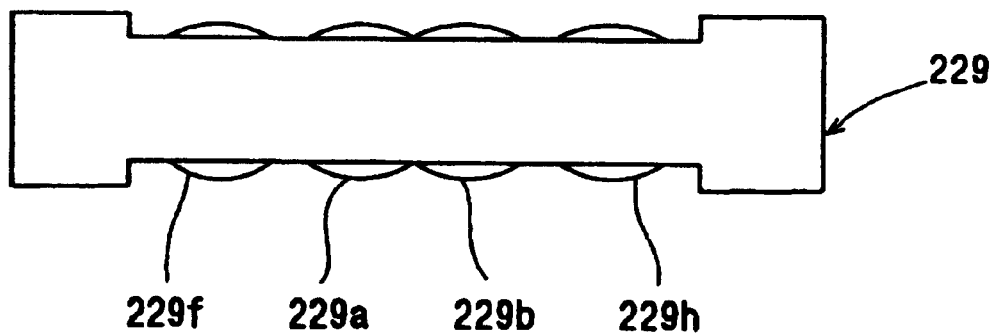
FIG. 18B is a plan view showing the bottom of the image reforming lens in correspondence with the fifth embodiment.

FIG. 17A is a front view and FIG. 17B is a bottom plan view of the image reforming lens 1129 in the sixth embodiment. The light flux having been exited from the lens portion 1124b of the condenser lens 1124 is made to enter a peripheral area SRa at the side toward the optical axis O2 of the focal point detection optical system in the off-set lens portion 1129f, as shown in FIG. 17A. FIG. 18A is a front view and FIG. 18B is a bottom plan view of the image reforming lens 229 in correspondence to the image reforming lens 29 in the fifth embodiment. As shown in FIG. 18A, the light flux having been exited from the lens portion 24b of the condenser lens 24 is made to enter a peripheral area SRb at the side toward the optical axis O2 of the focal point detection optical system in the off-set lens portion 229f. It is to be noted that the image reforming lens 229 is assumed in case that three focal point detection areas A, C and D are adopted in the focal point detection module in the fifth embodiment.

In reference to FIGS. 17A, 17B, 18A and 18B, the explanation will be given how the focal point detection module in the sixth embodiment is made smaller than the focal point detection module in correspondence to the fifth embodiment.

FIG. 7 shows the focal point detection areas A–F set within the photographic image plane of the focal point detection module in the fifth embodiment and FIG. 14 shows the focal point detection areas A, C and D set within the photographic image plane of the focal point detection module in the sixth embodiment. The right and left focal point detection areas C and D are set at same distances from the optical axis respectively. The specifications (the optical characteristics) of the focal point detection modules in the two embodiments are assumed to be the same.

The refractive power achieved in the off-axis lens portions 1124b and 1124c of the condenser lens 1124 in the sixth embodiment is larger than the refractive power achieved in the off-axis lens portions 24b and 24c of the condenser lens 24 in the fifth embodiment. Angles between the focal point detection light fluxes 1103f each having traveled through the off-axis lens portions 1124b and 1124c of the condenser lens 1124 in the sixth embodiment and the optical axis O2 are assumed to be θ100. Angles between the focal point detection light fluxes 3f each having traveled through the off-axis lens portions 24b and 24c of the condenser lens 24 in the fifth embodiment and the optical axis O2 are assumed to be θ1 (see FIG. 13A). In this case, the angles are set as θ100>θ1.

As a result, in the sixth embodiment, the focal point detection light fluxes 1103f are made to enter the peripheral areas SRa in the image reforming lens 1129, as shown in FIG. 17A. In the fifth embodiment, the focal point detection light fluxes 3f are made to enter the peripheral areas SRb in the image reforming lens 29, as shown in FIG. 18A. In the sixth embodiment, the refractive power achieved in the off-axis lens portion 1124b of the condenser lens 1124 is made larger. Therefore, the peripheral area SRa is set closer to the optical axis O2 of the focal point detection optical system compared to the peripheral area SRb.

Moreover, in the sixth embodiment, a spherical curvature of the surfaces of the image reforming lenses 1129e, 1129f, 1129g and 1129h is set substantially equal to a curvature of the surfaces of the image reforming lenses 1129a and 1129b on the optical axis. Therefore, the thickness of the image reforming lenses 1129e, 1129f, 1129g and 1129h should become thicker than the thickness of the image reforming lenses 1129a and 1129b on the optical axis. In addition, the surface curvature of the image reforming lenses 1129c, 1129fm 1129g and 1129h is equal to the spherical curvature of the surfaces of the image reforming lenses 229a, 229b, 229e, 229f, 229g and 229h of the image reforming lens 229 in correspondence to the fifth embodiment.

Namely, as detailed below, in the sixth embodiment, it is possible to miniaturize the size of the image sensor chip 130 along the x-axis direction compared to the focal point detection module having three focal point detection areas A, C and D assumed to correspond to the fifth embodiment.

(1) The refractive power achieved in the off-axis lens portion 1124b on the condenser lens 1124 is made larger. As a result, The incident angle θ100 at which the focal point detection light flux enters the image reforming lens 1129 becomes bigger than the hypothetical incident angle θ1 in the focal point detection module in correspondence to the fifth embodiment. The following structure is adopted in order to collimate the incident light flux to the optical axis O2 of the focal point detection optical system.

(2) The positions, the sizes and the like assumed in each lens portion of the image reforming lens are set equal to those of the fifth embodiment, apart from the thickness of the lens portions 1129e, 1129f, 1129g and 1129h set off-axis. For instance, every spherical curvature achieved in the entry-side and exit-side of the image reforming lens is set equal. Consequently, the thickness of the image reforming lens 1129f should become thicker than the thickness of the image reforming lenses 1129a and 1129b on the optical axis, based upon the reason detailed below.

(3) The peripheral area SRa where the focal point detection light flux is made to enter the off-axis lens portion 1129f of the image reforming lens 1129 is set closer toward the optical axis O2 of the focal point detection optical system compared to the peripheral area SRb of the image reforming lens 229f. Then, the thickness of the image reforming lens 1129f should be made thicker than the thickness of the image reforming lenses 1129a and 1129b on the optical axis in order to enable the focal point detection light flux to enter the area having the greater refractive power. As a result, it is possible for the focal point light flux having entered the image reforming lens portion 1129f at the angle θ100 (>θ1) to proceed substantially parallel to the optical axis of the focal point detection optical system.

By adopting the image reforming lens detailed above, it is possible to reduce the cost of a mold for molding the lenses owing to the same surface curvature of the lens portions.

It is to be noted that in the second~sixth embodiments, a focal point detection light flux entering an image reforming lens unit portion from a diagonal direction is made to exit roughly parallel to the optical axis of the focal point detection optical system in a focal point detection module allowing the image sensor chip to be provided as a compact unit by deflecting a focal point detection light flux in the photographic light flux entering from the photographic lens, which passes through a focal point detection area set off-axis, toward the focal point detection optical system with a condenser lens. Accordingly, the present invention is not limited to the examples presented in the embodiments and instead may be adopted in all types of optical systems achieving similar functions.

The advantages achieved in the second~fifth embodiments are explained by comparing the embodiments to the prior art examples.

In reference to FIGS. 19A~21A, 21B, problems occurring in the prior art technology with respect to the focal point detection light flux passing through the off-axis focal point detection area L distanced from the optical axis along the horizontal direction Y are explained. FIGS. 19A and 19B and FIGS. 20A and 20B present conceptual diagrams of the focal point detection light flux corresponding to the off-axis focal point detection area L within the XZ plane. In the figures, the field mask 22, the condenser lens 24, the aperture mask 28, the image reforming lens unit 29 and the image sensor chip 30 are shown on a single straight line for purposes of simplification. The light flux having been defined at the field mask 22 is deflected at the condenser lens 24 toward the optical axis O2 of the focal point detection optical system. This light flux undergoes pupil division along direction Y at the aperture mask 28 to become a pair of light fluxes 3e and 3f, images of which are subsequently formed on the image-capturing elements 30e and 30f by the image reforming lens unit portions 29e and 29f respectively.

Figures 19A, 19B:
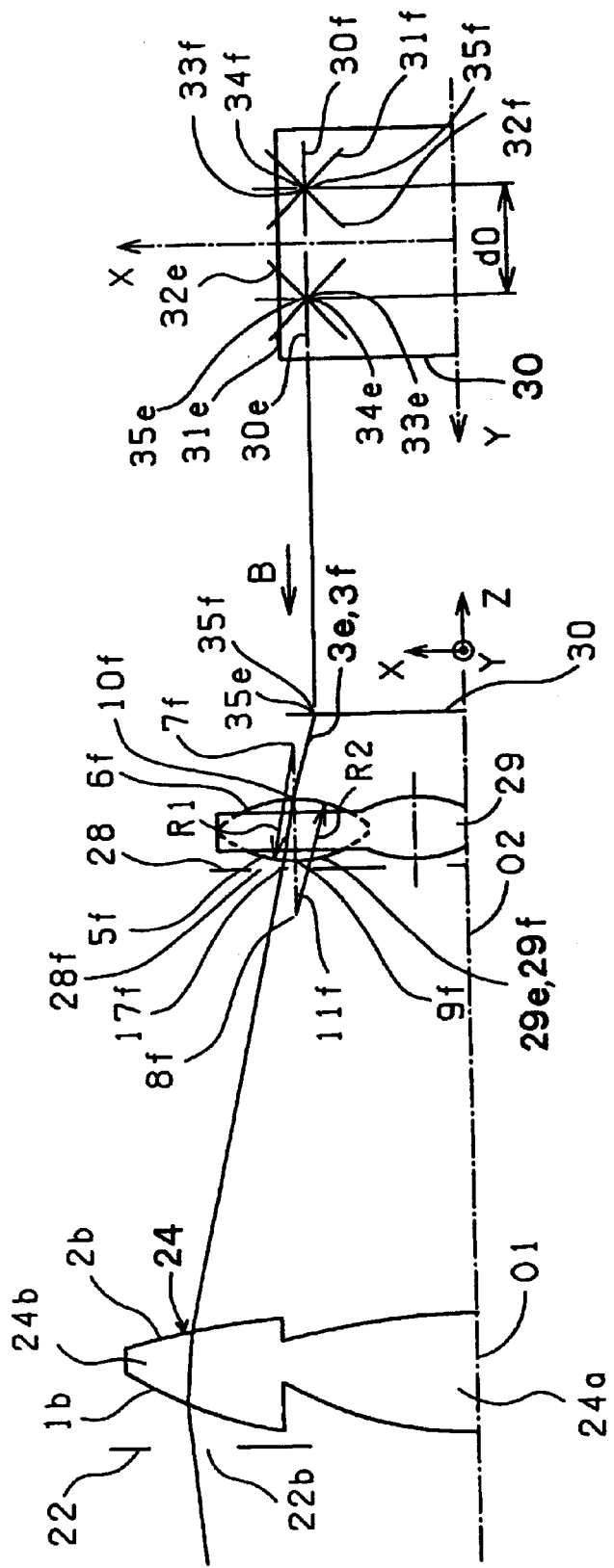
FIG. 19A shows a light flux entering an off-axis focal point detection area at a focal point detection module in the prior art.
FIG. 19B shows the light flux in FIG. 19A viewed from direction B.

As shown in FIGS. 19A and 19B, no focal point detection error occurs as long as the image sensor chip 30 is mounted at the holder 21 so as to set the light-receiving surfaces of the pair of image-capturing elements 30e and 30f perpendicular to the optical axis O2 of the focal point detection optical system within the YZ plane. However, the following problem occurs if the image sensor chip 30 is mounted at the holder at a given angle relative to the optical axis O2 of the focal point detection optical system and, as a result, the light-receiving surfaces of the image-capturing elements 30e and 30f become tilted relative to the optical axis O2, as shown in FIG. 20C.

An explanation is given on a situation in which the diagonal charts inclining within the XY plane, as shown in FIGS. 21A and 21B, are photographed. A chart 41 in FIG. 21A forms images 31e and 31f, as shown in FIGS. 19B and 20B. In a focal point detection apparatus adopting the phase difference detection method, the degree of defocus from the focus position and the direction along which the defocus manifests are calculated based upon the distance between the pair of images 31e and 31f. A chart 42 in FIG. 21B forms images 32e and 32f, as shown in FIGS. 19B and 20B. The degree of defocus from the focus position and the direction in which the defocus manifests are calculated in a similar manner based upon the distance between the pair of images 32e and 32f.

In the focal point detection module shown in FIGS. 19A and 19B, in which the light-receiving surfaces of the image-capturing elements are set perpendicular to the optical axis O2 of the focal point detection optical system within the YZ plane, the distance between the images 31e and 31f and the distance between the images 32e and 32f are both d0. In the focal point detection module shown in FIGS. 20A and 20B in which the light-receiving surfaces of the image-capturing elements are tilted relative to the optical axis O2 of the focal point detection optical system, on the other hand, the distance between the images 31e and 31f is d1 and the distance between the images 32e and 32f is d2. Thus, an error occurs in the results of a focal point detection if the image sensor chip is mounted at an angle relative to the optical axis of the focal point detection optical system in this manner. While the extent of such an error depends on the angle of the contrast pattern at the subject and thus, the error is canceled out to an extent when a subject with a random contrast pattern is used as is the case in typical application, it is crucial that the cause for the error be eliminated in order to achieve an improvement in focal point detection accuracy. While the cause of the error may be eliminated by adjusting the angle at which the image sensor chip is mounted, the production costs are bound to increase as a result of providing an adjustment mechanism for this purpose and also, a complicated adjustment process must be implemented.

Seventh Embodiment

The seventh embodiment is explained in reference to FIGS. 22~25. As in FIG. 7 used to explain the second~fifth embodiments, the following six focal point detection areas are set within a rectangular photographic image plane P in the seventh embodiment.

1. An area CH extending along the horizontal direction around a central optical axis LX.
2. An area CV extending along the vertical direction (the direction extending perpendicular to the area CH) around the optical axis LX.
3. An area L extending along the vertical direction, over a distance from the optical axis LX to the left (the first direction: the direction along which the long side of the photographic image plane extends).
4. An area R extending along the vertical direction, over a distance from the optical axis LX to the right (a first direction: the direction along which the long side of the photographic image plane extends).
5. An area T extending along the horizontal direction, over a distance from the optical axis LX toward the top (the second direction: the direction along which the short side of the photographic image plane extends).
6. An area B extending along the horizontal direction, over a distance from the optical axis LX toward the bottom (a second direction: direction along which the short side of the photographic image plane extends).

Figure 22:
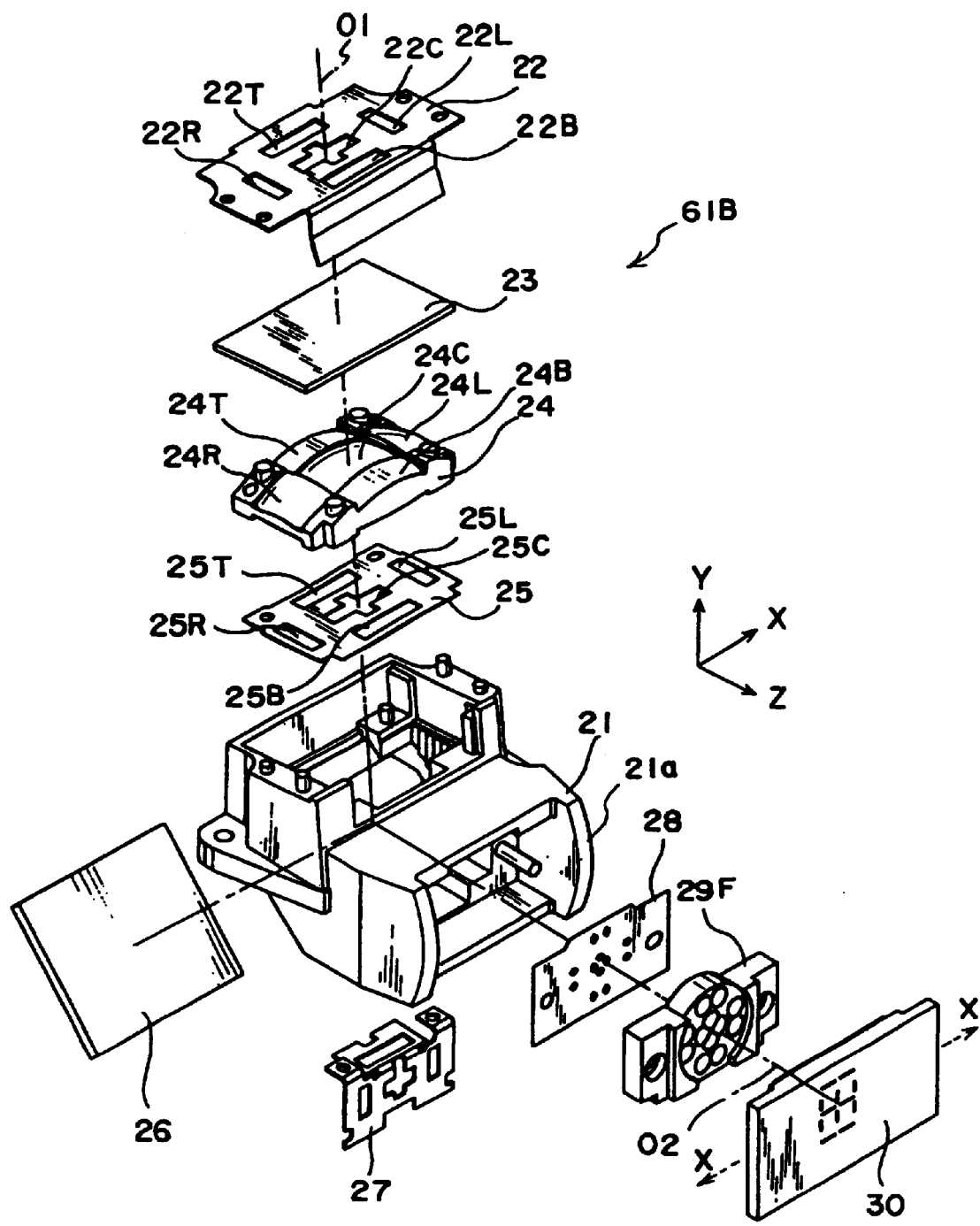
FIG. 22 is an exploded perspective showing the structure adopted in the focal point detection module in a seventh embodiment.
Figure 23:
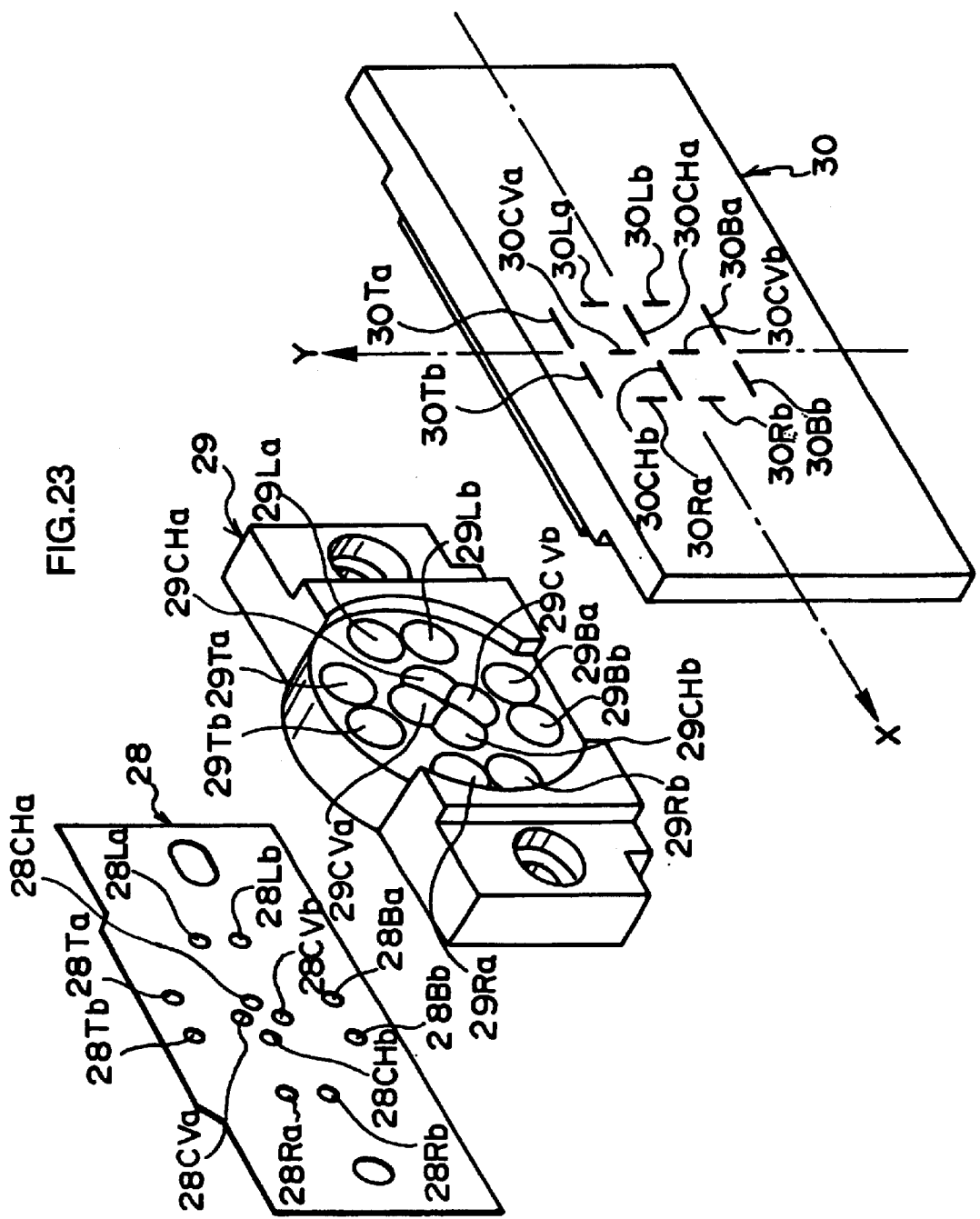
FIG. 23 is an enlargement of part of the focal point detection module in FIG. 22.
Figure 24:
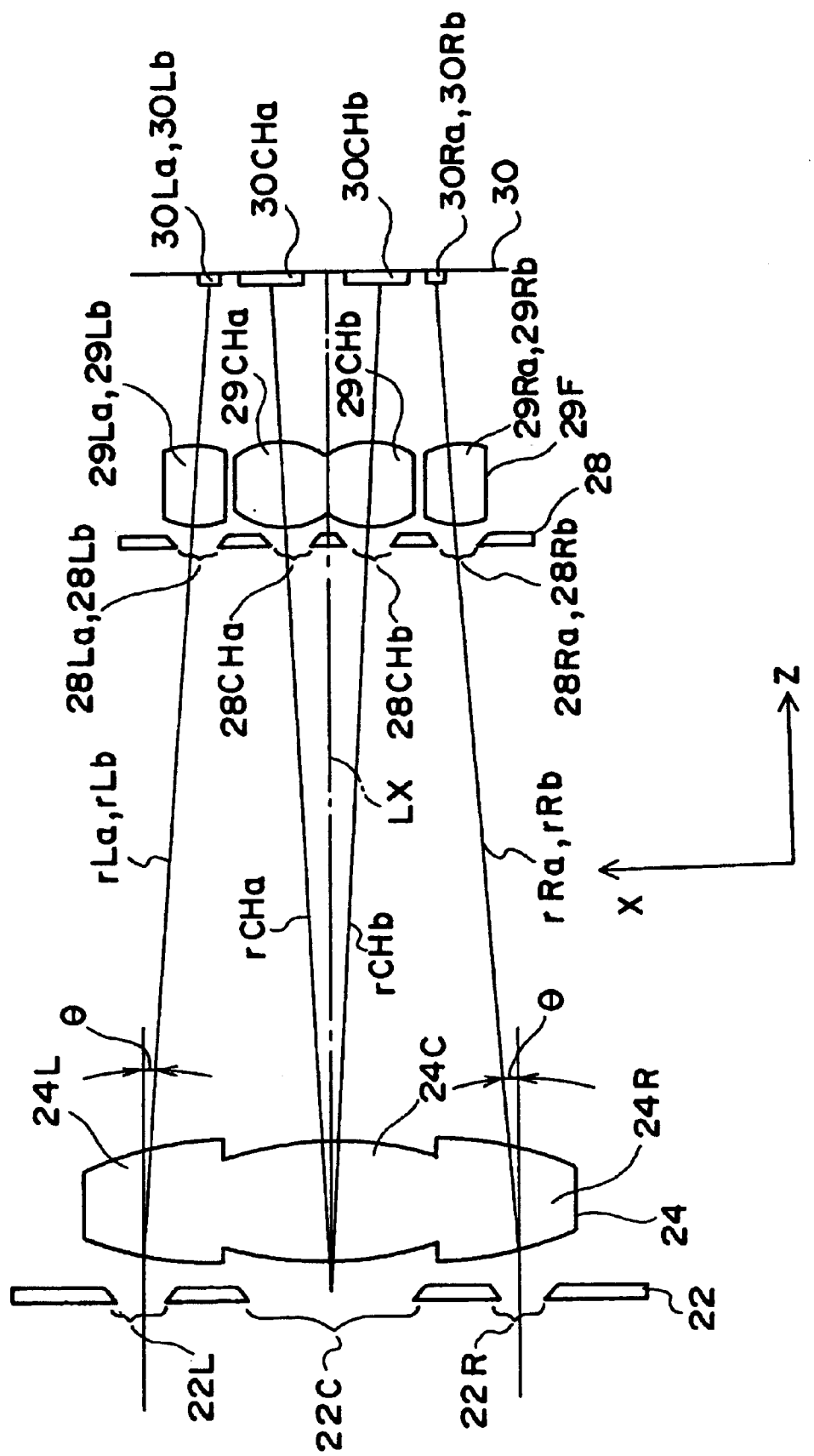
FIG. 24 shows the state of light fluxes inside the focal point detection module.

FIG. 22 corresponds to FIG. 8 and FIG. 23 corresponds to FIG. 9. As shown in FIG. 24, for the left and right off-axis focal point detection areas L and R, focal point detection light fluxes are deflected toward the optical axis LX (O1, O2) by lenses 24L and 24R of a fields lens (condenser lens) 24 as in the second~fifth embodiments.

The embodiment differs from the previous embodiments in the following two points.

1. The holder 21 rotatably holds the image sensor chip 30 to allow the image sensor chip 30 to rotate around the X axis.
2. The focal point detection light fluxes exiting a separator lens (image reforming lens unit) 29F after entering the separator lens from the aperture mask 28 are not deflected.

Accordingly, the following explanation focuses on the differences from the focal point detection module 61A shown in FIG. 8.

The image sensor chip 30 is bonded at the holder 21 at a pair of curved surfaces 21a, i.e., a left curved surface 21a and a right curved surface 21a. By bonding the image sensor chip 30 at the curved surfaces 21a, it becomes possible to adjust the inclination of the image sensor chip 30 around the X axis (the axis extending along the first direction). The reason why such a positional adjustment is necessary is explained below.

Figure 25:
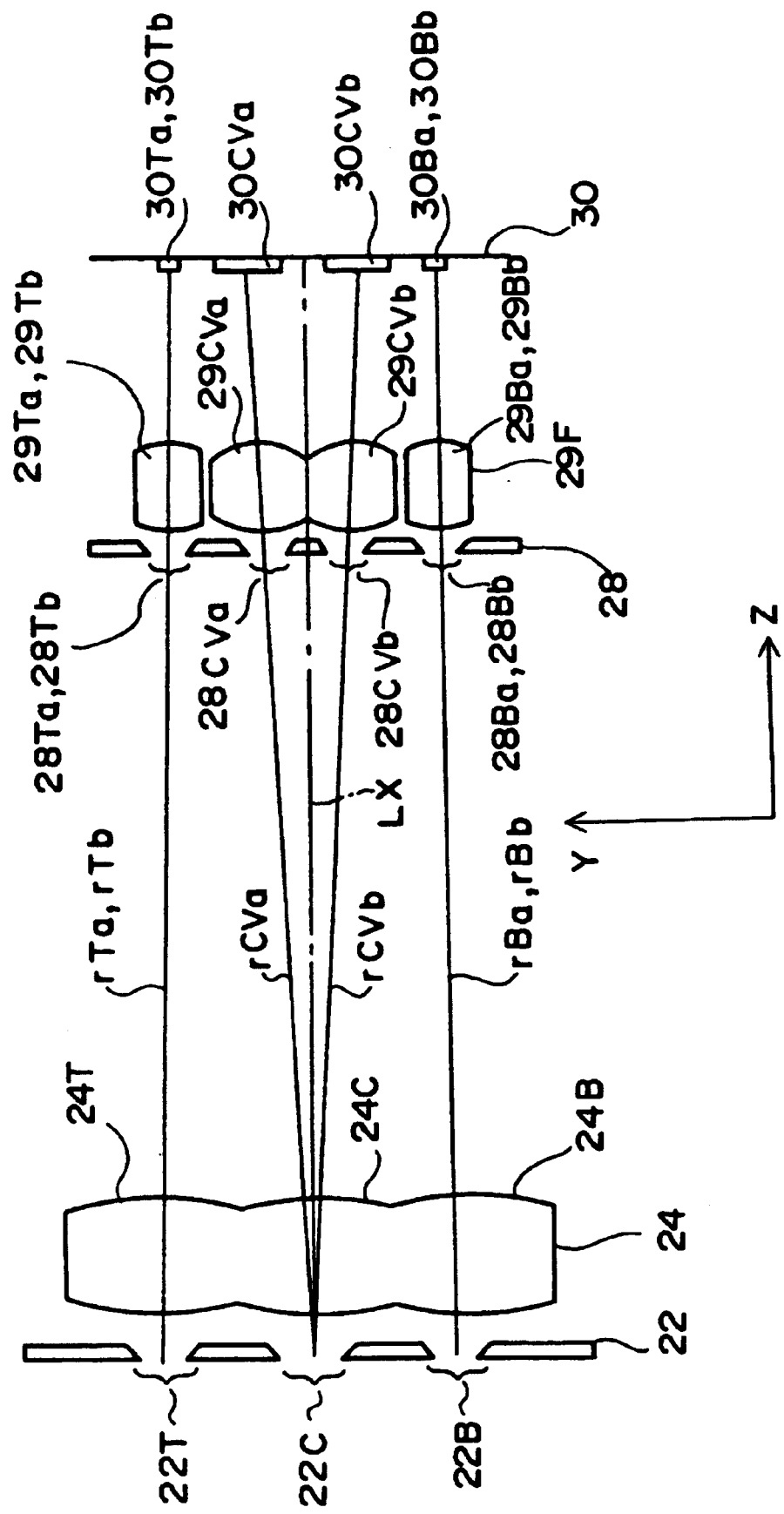
FIG. 25 shows the state of light fluxes inside the focal point detection module, viewed from a direction different from the direction assumed in FIG. 24.

FIGS. 24 and 25 show the light fluxes inside a focal point detection module 61B. For purposes of simplification, the illustration of the infrared clipping filter 23, the light blocking mask 25 for stray light elimination and the reflecting mirror 26 is omitted, and the field mask 22, the field lens 24, the aperture mask 28, the separator lens 29F and the image sensor chip 30 are shown on a single straight line. In addition, pairs of light fluxes obtained by splitting into two each light flux having passed through lenses 24C, 24L, 24R, 24T and 24B of the field lens 24 at the aperture mask 28 are respectively indicated as rCHa, rCHb : rCVa, rCVb : rTa, rTb : rBa, rBb : rLa, rLb : rRa, rRb.

FIG. 24 is a sectional view of the field mask 22 as related to the focal point detection areas L and R, taken along the X axis, i.e., a sectional view equivalent to a cross section taken along the horizontal direction. The pair of light fluxes rLa and rLb corresponding to apertures 28La and 28Lb of the aperture mask 28, lenses 29La and 29Lb of the separator lens 29 and the off-axis area L overlap along the direction perpendicular to the sheet on which the figure is drawn. Likewise, the pair of light fluxes rRa and rRb corresponding to apertures 28Ra and 28Rb of the aperture mask 28, lenses 29Ra and 29Rb of the separator lens 29 and the off-axis area R overlap along the direction perpendicular to the sheet on which the figure is drawn. In addition, as the light fluxes from the off-axis areas L and R travel outside the optical axes of the lenses 24L and 24R at the field lens 24, the light fluxes rLa and rLb and the light fluxes rRa and rRb resulting from the split are both deflected toward the optical axis LX at an angle of deflection θ and diagonally enter the light-receiving surfaces of image sensors 30La, 30Lb, 30Ra and 30Rb at an angle corresponding to the angle of deflection θ.

Since the light fluxes from the off-axis areas L and R are deflected toward the optical axis LX in this manner, the image sensors 30La, 30Lb, 30Ra and 30Rb can be set close to the optical axis LX even when the areas L and R are relatively far from the optical axis LX, to achieve miniaturization of the image sensor chip 30. However, the light fluxes rLa, rLb, rRa and rRb cannot be prevented from entering the sensors 30La and 30Lb and 30Ra and 30Rb from a diagonal direction, as described above. If the sensors 30La and 30Lb and 30Ra and 30Rb are tilted along the rotational direction around the X axis in FIG. 22 relative to the light fluxes in this state, the deterioration of the focal point detection accuracy attributable to the "squint phenomenon" advances to an extent that cannot be disregarded. Accordingly, an adjustment of the tilt of the sensor chip 30, i.e., the sensors 30La and 30Lb, and 30Ra and 30Rb around the X axis is enabled in the embodiment, to minimize the extent of the deterioration of the focal point detection accuracy attributable to the "squint phenomenon".

The tilt adjustment is implemented during the camera manufacturing stage. In more specific terms, the sensor chip 30 is placed in contact with the curved surfaces 21a of the holder 21, the chip 30 is rotated in small increments around the X axis while monitoring the state of the focal point detection and the sensor chip 30 is bonded at the angle at which the extent of the adverse effect of the "squint phenomenon" is the least.

FIG. 25 is a sectional view of the field mask 22 as related to the focal point detection areas T and B, taken along the Y axis, i.e., a sectional view equivalent to a cross section taken along the vertical direction. The pair of light fluxes rTa and rTb corresponding to apertures 28Ta and 28Tb of the aperture mask 28, lenses 29Ta and 29Tb of the separator lens 29 and the off-axis area T overlap along the direction perpendicular to the sheet on which the figure is drawn. Likewise, the pair of light fluxes rBa and rBb corresponding to apertures 28Ba and 28Bb of the aperture mask 28, lenses 29Ba and 29Bb of the separator lens 29 and the off-axis area B overlap along the direction perpendicular to the sheet on which the figure is drawn. In this case, since the light fluxes from the off-axis areas T and B pass through the areas close to the centers of the optical axes of the lenses 24T and 24B constituting the field lens 24, the light fluxes rTa and rTb and the light fluxes rBa and rBb are hardly deflected inward and enter the light-receiving surfaces of the image sensors 30Ta, 30Tb, 30Ba and 30Bb at almost a right angle.

The light fluxes rTa, rTb, rBa and rBb remain virtually undeflected since the off-axis areas T and B set along the vertical direction are positioned closer to the optical axis LX compared to the left and right off-axis areas L and R to allow the image sensors 30Ta, 30Tb, 30Ba and 30Bb to be positioned close to the optical axis LX without having to deflect the light fluxes and thus, the chip area is not increased. In addition, since the vertical direction extends along the short side of the rectangular photographic image plane, no problems related to the positional arrangement arise when the off-axis areas T and B provided along the vertical direction are set closer to the optical axis LX compared to the off-axis areas L and R provided along the horizontal direction (the direction extending along the long side of the rectangular photographic image plane).

As described above, the light fluxes rTa, rTb, rBa and rBb which remain almost completely undeflected enter the light-receiving surfaces of the sensors 30Ta, 30Tb, 30Ba and 30Bb almost at a right angle and thus, even when the sensors 30Ta, 30Tb, 30Ba and 30Bb are slightly tilted along the rotational direction around the Y axis (the axis extending along the second direction) in FIG. 22 relative to the light fluxes, the extent of deterioration of the focal point detection accuracy attributable to the "squint phenomenon" is minimized. For this reason, no mechanism for adjusting the tilt of the sensor chip 30 around the Y axis is provided in the embodiment and the positioning process can be completed simply by placing the two ends of the sensor chip 30 in contact with the two curves surfaces 21a of the holder 21. Thus, the structure is simplified compared to a structure enabling an adjustment of the sensor chip 30 both along the X axis and the Y axis, to achieve miniaturization of the camera and a reduction in production costs.

It is to be noted that while the first direction represents the direction along which the long side of the photographic image plane extends and the second direction represents the direction along which the short side of the photographic image plane extends in the explanation given above, the present invention is not limited by the example. In addition, the structure of the angle adjustment mechanism is not limited to that adopted in the embodiment, either.

It is to be noted that the greatest degree of miniaturization may be achieved in the focal point detection apparatus by combining the first~seventh embodiments described above as appropriate. Furthermore, but the present invention may be adopted in any of other types of cameras as well as in a single lens reflex camera.

What is claimed is:

1. A focal point detection apparatus that guides a pair of light fluxes originating from a subject and then passing off an optical axis of a photographic optical system, to an image sensor by a focal point detection optical system, forms a pair of subject images on said image sensor and detects a focal adjustment state of said photographic optical system based upon the degree to which said pair of subject images are offset, comprising:

a first deflection member that is positioned between said photographic optical system and a predicted focal image plane of said photographic optical system to deflect said pair of light fluxes from the subject passing off said optical axis of said photographic optical system toward said optical axis; and a second deflection member that deflects said pair of light fluxes from the subject which have been deflected by said first deflection member to allow them to advance substantially parallel to said optical axis, wherein
said first deflection member and said second deflection member are provided at said focal point detection optical system.

2. A focal point detection apparatus according to claim 1, wherein:

said second deflection member is provided forward or rearward relative to a field mask of said focal point detection optical system through which said subject light fluxes from said first deflection member are initially transmitted.

3. A focal point detection apparatus according to claim 1, wherein:

said second deflection member is provided behind a condenser lens of said focal point detection optical system.

4. A focal point detection apparatus according to claim 1, wherein:

said second deflection member is constituted of a condenser lens included in said focal point detection optical system; and said focal point detection optical system allows a principal ray of a focal point detection light flux to enter said condenser lens at a position decentered from an optical axis of said condenser lens.

5. A focal point detection module having an optical axis of a focal point detection optical system comprising:

a condenser lens that condenses photographic light fluxes passing through a plurality of focal point detection areas set both on an axis and off said axis within a photographic image plane;

a pupil division mask that achieves pupil division by restricting each of said photographic light fluxes passing through said plurality of focal point detection areas at a pair of apertures;

an image reforming lens unit that reforms images of said pair of light fluxes resulting from said pupil division achieved at said pupil division mask; and an image-capturing element that converts said pair of light fluxes the images of which have been reformed on light-receiving surfaces by said image reforming lens unit to electrical signals and outputs the electrical signals, wherein:

said pair of apertures of said pupil division mask are set relative to off-axis lens portions so as to allow said pair of light fluxes achieved by dividing at said pupil division mask a light flux having passed through a focal point detection area set off axis to enter peripheral areas in said off-axis lens portions corresponding to said focal point detection area set off axis among a plurality of lens portions included in said image reforming lens unit, said peripheral areas being located in said off-axis lens portions between optical axes of said off-axis lens portions and said optical axis of said focal point detection optical system, and positions of centers of gravity of said pair of apertures being positioned toward said optical axis of said focal point detection optical system relative to said optical axes of said off-axis lens portions.

6. A focal point detection module according to claim 5, wherein:

said off-axis lens portions each include an entry-side spherical surface and an exit-side spherical surface; and when line segments connecting a center of each said entry-side spherical surface and a center of each respective said exit-side spherical surface constitute said optical axes of said off-axis lens portions, projections achieved by projecting the optical axes of said off-axis lens portions onto a plane perpendicular to a direction of said pupil division are roughly parallel to said optical axis of said focal point detection optical system.

7. A focal point detection module according to claim 5, wherein:

one of an entry side and an exit side of said off-axis lens portions is constituted of a non-spherical lens.

8. A focal point detection module according to claim 5, wherein:

said off-axis lens portions at which said pair of light fluxes achieved by dividing at said pupil division mask a light flux having passed through an off-axis focal point detection area enter each include an entry-side spherical surface and an exit-side spherical surface; and when line segments connecting a center of each said entry-side spherical surface and a center of each respective said exit-side spherical surface constitute said optical axes of said off-axis lens portions, projections achieved by projecting said optical axes of said off-axis lens portions onto a plane perpendicular to a direction of said pupil division are tilted at a predetermined angle relative to said optical axis of said focal point detection system so as to set said light fluxes exiting said off-axis lens portions roughly parallel to said optical axis of said focal point detection optical system.

9. A focal point detection module according to claim 5, wherein:

at each of said off-axis lens portions of said image reforming lens unit at which said pair of light fluxes achieved by dividing at said pupil division mask a light flux having passed through said off-axis focal point detection area enter one of an entry side and an exit side thereof is constituted of a non-spherical lens; and a projection achieved by projecting an axis of rotation symmetry of said non-spherical lens onto a plane perpendicular to a direction of said pupil division is tilted at a predetermined angle relative to said optical axis of said focal point detection optical system so as to set the light fluxes exiting said off-axis lens portions roughly parallel to said optical axis of said focal point detection optical system.

10. A focal point detection module having an optical axis of a focal detection optical system comprising:

a condenser lens that condenses photographic light fluxes passing through a plurality of focal point detection areas set both on an axis and off said axis within a photographic image plane;

a pupil division mask that achieves pupil division by restricting each of said photographic light fluxes passing through said plurality of focal point detection areas at a pair of apertures;

an image reforming lens unit that reforms images of said pair of light fluxes resulting from said pupil division achieved at said pupil division mask; and an image-capturing element that converts said pair of light fluxes the images of which have been reformed on light-receiving surfaces by said image reforming lens unit to electrical signals and outputs the electrical signals, wherein:

off-axis lens portions at which a pair of light fluxes achieved by dividing at the pupil division mask a light flux having passed through an off-axis focal point detection area enter each include an entry-side spherical surface and an exit-side spherical surface;

an apex of said entry-side spherical surface and an apex of said exit-side spherical surface are decentered along a direction perpendicular to a direction of said pupil division to each other; and an area surrounding said entry-side spherical surface and said exit-side spherical surface is constituted of a single flat surface shared with another lens portion.

11. A focal point detection apparatus comprising:

a first optical system that splits into two a light flux originating from a first focal point detection area set apart from an optical axis of a photographic lens by a first distance along a first direction and deflects the light flux at predetermined deflection angles toward said optical axis;

a second optical system that splits into two a light flux originating from a second focal point detection area set apart from said optical axis of the photographic lens by a second distance along a second direction;

a pair of first focal point detection elements that receive the light fluxes resulting from the split at said first optical system at angles corresponding to the individual deflection angles;

a pair of second focal point detection elements that receive the light fluxes resulting from the split achieved at the second optical system; and a holding device that holds said first focal point detection elements and second focal point detection elements on a single surface, wherein:

said second distance is set shorter than said first distance, said second optical system splits into two said light flux from said second focal point detection area and deflects said light flux toward said optical axis at deflection angles smaller than the deflection angles set at said first optical system or said second optical system splits into two said light flux from said second focal point detection area without deflecting, and an angle adjustment mechanism used to adjust an angle of said holding device around the axis extending along said first direction to secure said holding device to an apparatus main body is provided.

12. A focal point detection apparatus according to claim 11, wherein:

said first direction is a direction along which a long side of a rectangular photographic image plane extends and said second direction is a direction along which a short side of said photographic image plane extends.

13. A focal point detection module according to claim 6, wherein:

curvatures each achieved in said entry-side spherical surface and said exit-side spherical surface of said off-axis lens portion are substantially equal to those of an on-axis lens portion included in said image reforming lens unit at which a focal point detection light flux on said optical axis enters and a thickness of said off-axis lens portions in an optical axis direction is thicker than a thickness of said on-axis lens portion in said optical axis direction.

* * * * *